United States Patent
Sugiyama et al.

(10) Patent No.: US 8,269,929 B2
(45) Date of Patent: Sep. 18, 2012

(54) VERTICALLY ALIGNED LIQUID CRYSTAL DISPLAY DEVICE WITH VISUAL ANGLE COMPENSATION

(75) Inventors: Takashi Sugiyama, Yokohama (JP); Yoshihisa Iwamoto, Yokohama (JP)

(73) Assignee: Stanley Electric Co., Ltd., Tokyo (JP)

( * ) Notice: Subject to any disclaimer, the term of this patent is extended or adjusted under 35 U.S.C. 154(b) by 975 days.

(21) Appl. No.: 11/863,078

(22) Filed: Sep. 27, 2007

(65) Prior Publication Data

US 2008/0079878 A1 Apr. 3, 2008

(30) Foreign Application Priority Data

Sep. 28, 2006 (JP) ................................. 2006-265219
Dec. 5, 2006 (JP) ................................. 2006-328422
Mar. 9, 2007 (JP) ................................. 2007-060177

(51) Int. Cl.
*G02F 1/1335* (2006.01)
(52) U.S. Cl. ........................................ 349/119; 349/120
(58) Field of Classification Search .................. None
See application file for complete search history.

(56) References Cited

U.S. PATENT DOCUMENTS

| | | | |
|---|---|---|---|
| 4,889,412 A | 12/1989 | Clerc et al. | |
| 6,226,064 B1 | 5/2001 | Shimada et al. | |
| 6,512,561 B1 | 1/2003 | Terashita et al. | |
| 6,642,981 B1 | 11/2003 | Ohmuro et al. | |
| 6,816,223 B2 | 11/2004 | Sugiyama et al. | |
| 6,919,946 B2* | 7/2005 | Allen et al. | 349/121 |
| 7,315,341 B2* | 1/2008 | Nimura et al. | 349/117 |
| 7,403,248 B2 | 7/2008 | Uchida et al. | |
| 2002/0039159 A1* | 4/2002 | Yano et al. | 349/117 |
| 2003/0058393 A1* | 3/2003 | Terashita et al. | 349/117 |
| 2004/0218124 A1* | 11/2004 | Mi et al. | 349/117 |
| 2005/0128394 A1* | 6/2005 | Lee et al. | 349/119 |
| 2006/0203165 A1* | 9/2006 | Shibazaki | 349/126 |

FOREIGN PATENT DOCUMENTS

| | | |
|---|---|---|
| JP | 7-69536 B2 | 7/1995 |
| JP | 11-109335 A | 4/1999 |
| JP | 2000-019518 A | 1/2000 |
| JP | 3027805 B2 | 1/2000 |
| JP | 3330574 B2 | 7/2002 |
| JP | 2003-262869 A | 9/2003 |
| JP | 2004-252298 A | 9/2004 |
| JP | 2005-120179 A | 5/2005 |
| JP | 2005-292229 A | 10/2005 |

OTHER PUBLICATIONS

Japanese Office Action dated Oct. 4, 2011 (and an English translation thereof) in counterpart Japanese Application No. 2006-265219.

* cited by examiner

*Primary Examiner* — Richard Kim
(74) *Attorney, Agent, or Firm* — Holtz, Holtz, Goodman & Chick, PC

(57) ABSTRACT

A vertically aligned liquid crystal cell to be simple-matrix driven is disposed between two polarizing plates crossed-Nicol disposed, the liquid crystal cell including a liquid crystal layer having a retardation in a cross section in a thickness direction larger than 550 nm. A C plate and a biaxial plate are disposed collectively between the liquid crystal cell and one of the polarizing plates, the C plate being disposed on the liquid crystal cell side and the biaxial plate being disposed on the polarizing plate side. The biaxial plate is disposed in such a manner that the in-plane delay phase axis of the biaxial plate is perpendicular to the absorption axis of the adjacent polarizing plate.

8 Claims, 30 Drawing Sheets

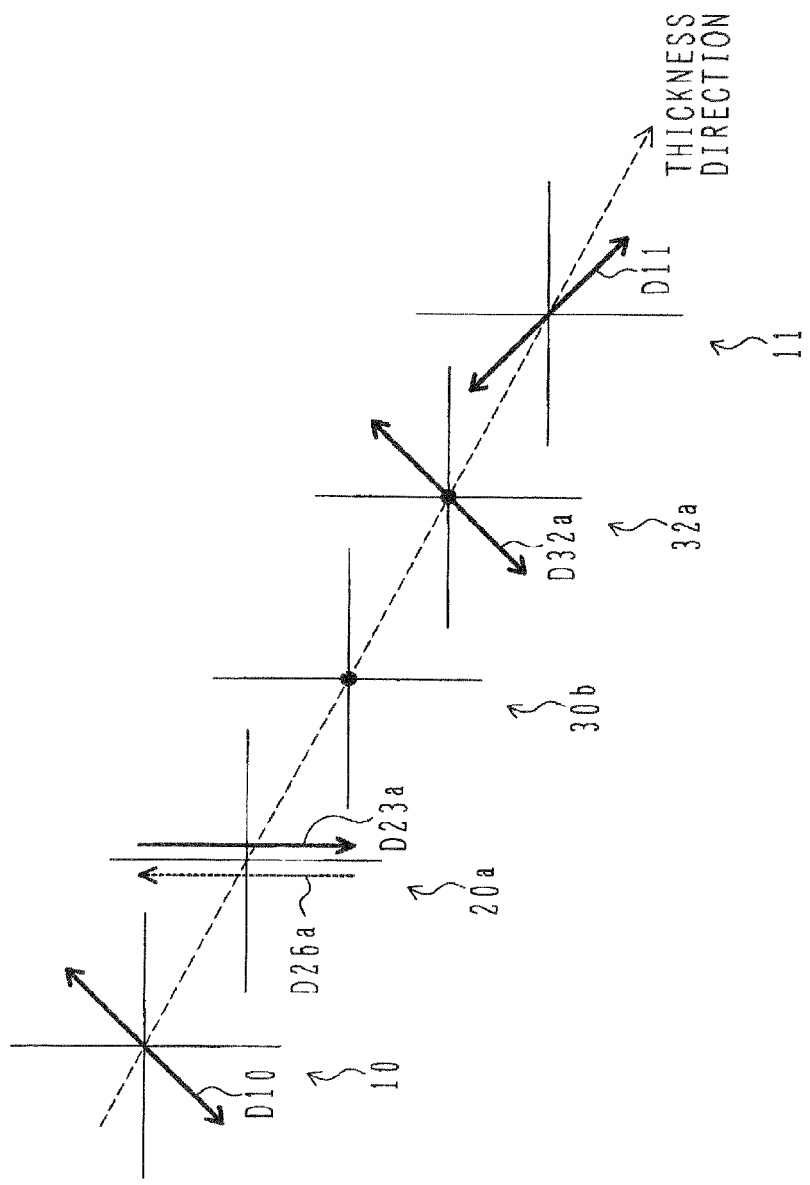

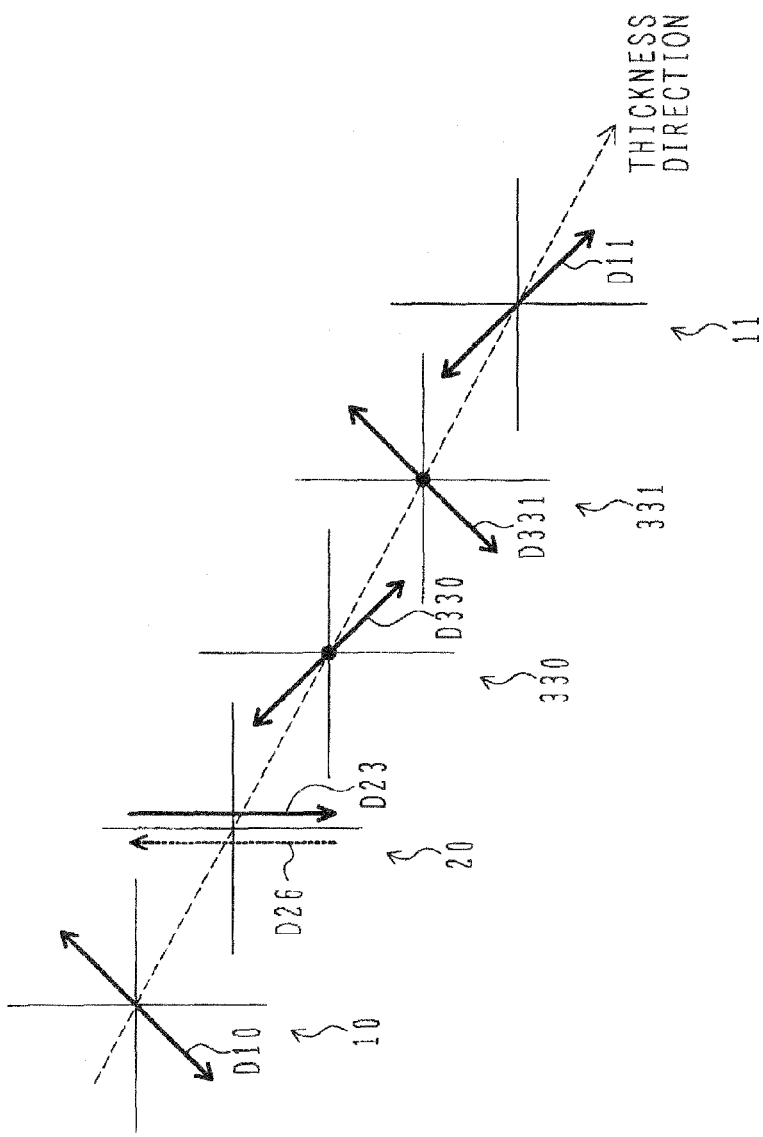

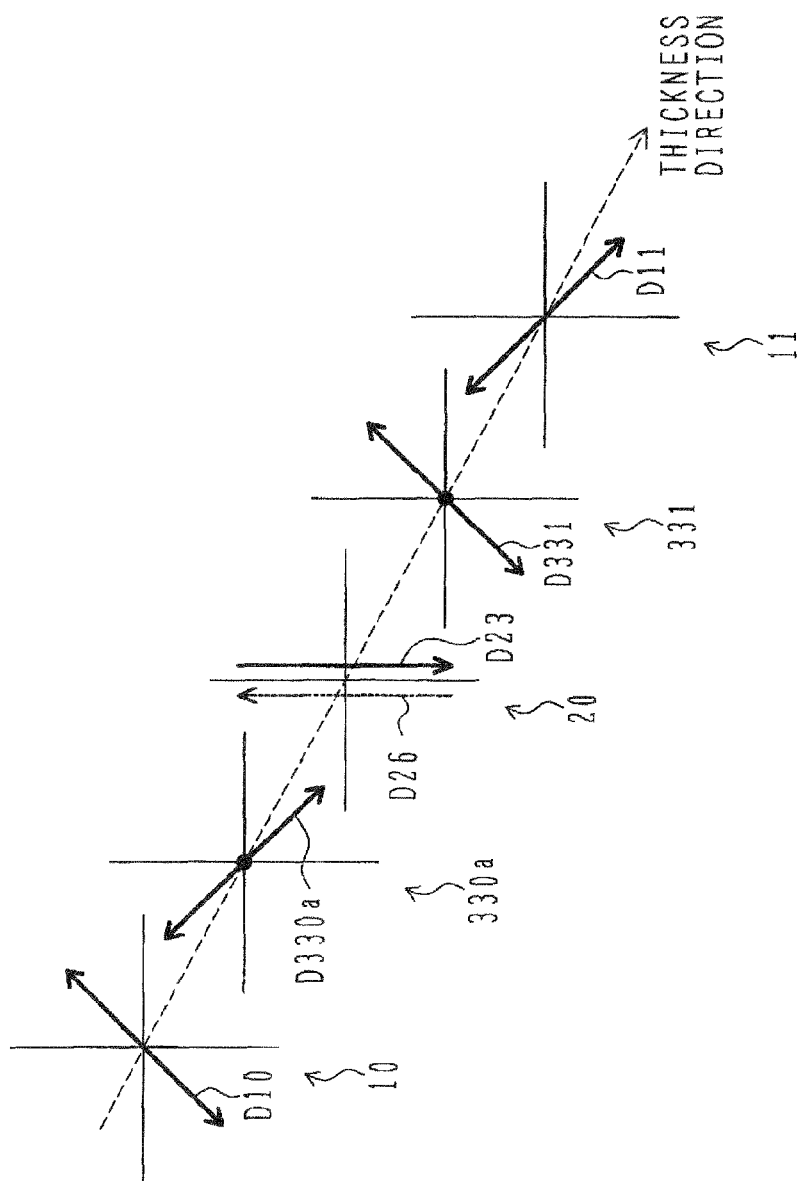

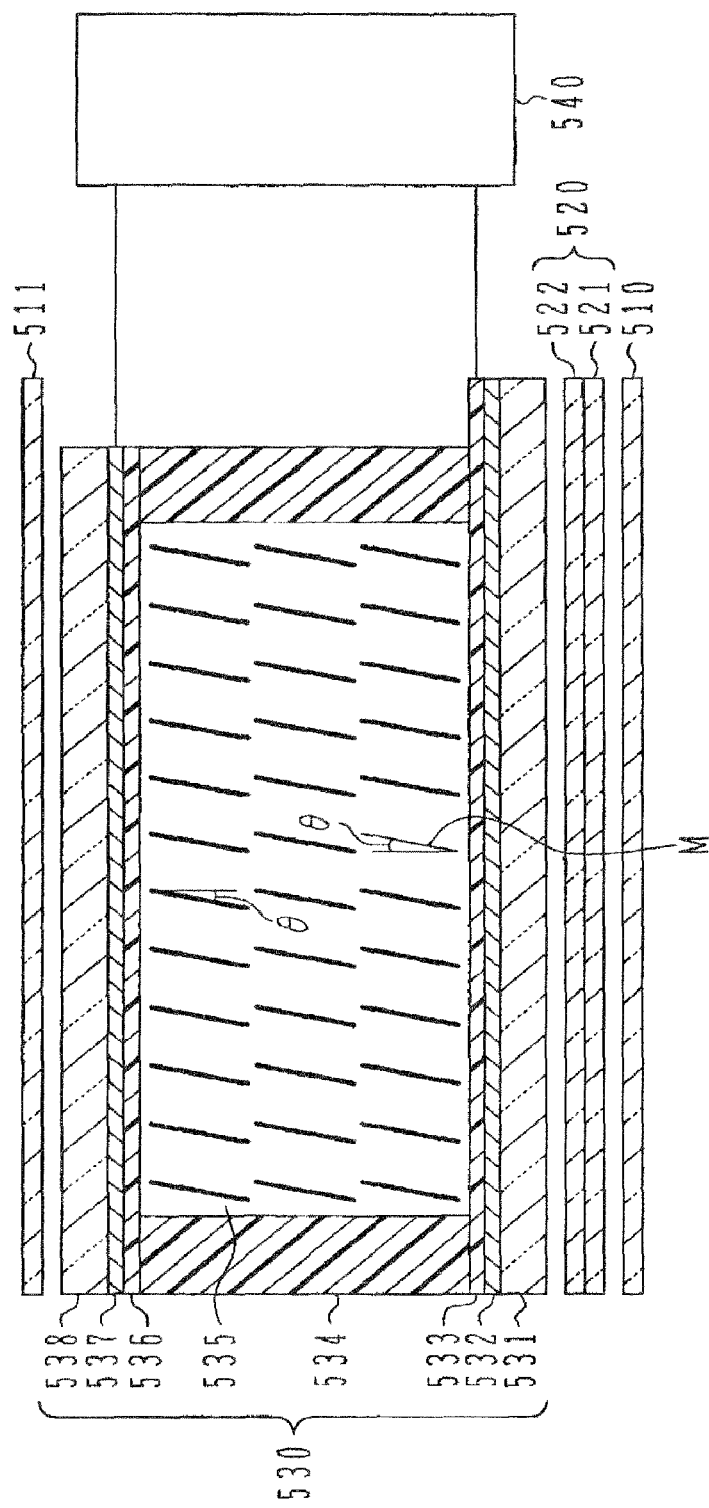

VERTICALLY ALIGNED LIQUID CRYSTAL DISPLAY DEVICE WITH VISUAL ANGLE COMPENSATION

CROSS REFERENCE TO RELATED APPLICATION

This application is based on and claims priority of Japanese Patent Applications No. 2006-265219 filed on Sep. 28, 2006, No. 2006-328422 filed on Dec. 5, 2006 and No. 2007-060177 filed on Mar. 9, 2007, the entire contents of which are incorporated herein by reference.

BACKGROUND OF THE INVENTION

A) Field of the Invention

The present invention relates to a liquid crystal display device, and more particularly to a vertically aligned liquid crystal display device with visual angle compensation.

B) Description of the Related Art

As visual angle compensation technologies for a vertically aligned liquid crystal display device, methods using visual angle compensation plates having various optical characteristics have been proposed as described in the following.

JP-B-HEI-7-69536 discloses a use of a visual angle compensation plate having three primary refractive indices $n_x$, $n_y$ and $n_z$, the refractive index $n_z$ being smaller than the other two primary refractive indices $n_x$ and $n_y$, and the axis corresponding to the smallest primary refractive index $n_z$ being parallel to the surface normal direction of the compensation plate (having negative refractive index anisotropy). This visual angle compensation plate is disposed between a liquid crystal cell and at least one of polarizing plates crossed-Nicol disposed on both sides of the liquid crystal cell. Used as the visual angle compensation plate is either a negative uniaxial compensation plate: a so-called C plate in which in-plane refractive indices $n_x$ and $n_y$ are equal and the optical axis is parallel to a surface normal direction of the visual angle compensation plate, or a negative biaxial compensation plate: a so-called biaxial plate in which in-plane refractive indices $n_x$ and $n_y$ are not equal.

Japanese Patent No. 3330574 also disposes a biaxial plate similar to that described in JP-B-HEI-7-69536 inserted between a liquid crystal cell and at least one of polarizing plates crossed-Nicol disposed on both sides of the liquid crystal cell. Japanese Patent No. 3330574 discloses that it is preferable to dispose the biaxial plate in such a manner that an axis corresponding to an in-plane larger primary refractive index of the biaxial plate, i.e., a delay phase axis, is made generally parallel or perpendicular to an absorption axis of the polarizing plate in the display plane, and to set an in-plane retardation of the biaxial plate to 120 nm or smaller.

Japanese Patent No. 3027805 also discloses a visual angle compensation plate disposed between a liquid crystal cell and at least one of polarizing plates crossed-Nicol disposed on both sides of the liquid crystal cell. Japanese Patent No. 3027805 discloses that a uniaxial compensation plate having positive refractive index anisotropy and an in-plane optical axis ($n_z=n_y<n_x$ where $n_z$ is a refractive index in a surface normal direction, and $n_x$ and $n_y$ are in-plane two refractive indices), a so-called A plate, and a C-plate such as described above are used as a combination of the A plate disposed on the liquid crystal cell side and the C plate disposed on the polarizing plate side, and that it is preferable to set an in-plane retardation of the A plate to 120 nm or smaller.

JP-A-2000-19518 discloses that it is effective to use the biaxial plate disclosed in JP-B-HEI-7-69536 and Japanese Patent No. 3330574 and the visual angle compensation plate of stacked A and C plates disclosed in Japanese Patent No. 3027805.

Japanese Patents No. 3330574, No. 3027805 and JP-A-2000-19518 design the conditions of an optical compensation plate based on the visual angle compensation principle of a vertically aligned liquid crystal display device shown in JP-B-HEI-7-69536 so as to obtain more effective visual angle compensation.

JP-B-HEI-7-69536 does not limit a range of a product of a birefringence and a cell thickness, i.e., a retardation in a cell cross section in a thickness direction, of liquid crystal material of a vertically aligned liquid crystal device. Japanese Patents No. 3330574, No. 3027805 and JP-A-2000-19518 have studied a range of a retardation in a cell cross section in a thickness direction. As a retardation in a cell cross section in a thickness direction, Japanese Patents No. 3330574 and No. 3027805 (refer to paragraph [0037] in both cases) disclose that the retardation is preferably a minimum of 80 nm and a maximum of 400 nm, and JP-A-2000-19518 (refer to claim 13) discloses that the retardation is preferably a minimum of 300 nm and a maximum of 550 nm.

The preferable range of a retardation in a cell cross section in a thickness direction of a liquid crystal layer disclosed in Japanese Patents No. 3330574 and No. 3027805 and JP-A-2000-19518 is applied to an active matrix type liquid crystal display device, typically a thin film transistor (TFT) liquid crystal display (LCD) (i.e., a full-dot type LCD).

There is a vertically aligned liquid crystal display device which performs a segment display and is simple-matrix driven. A retardation of a liquid crystal layer in a cross section of such a vertically aligned liquid crystal display device is desired to be set larger than that of an active matrix type liquid crystal display device, from the viewpoint of good on/off operation. It is desired to provide visual angle compensation techniques particularly effective for a vertically aligned liquid crystal display device having a liquid crystal cell with a large retardation in a cross section in the thickness direction.

Japanese Patent No. 3330574 discloses (in paragraph [0044]) that it is preferable to set a retardation of a visual angle compensation plate in a cross section in a thickness direction approximately equal to that of the liquid crystal cell in a cross section in a thickness direction, and discloses (in paragraph [0049]) that it is preferable to set a pretilt angle as small as possible (to align liquid crystal molecules generally perpendicular to an alignment film surface).

Also in a vertically aligned liquid crystal display device of a segment display type driven by a simple matrix driving method, the retardations of a visual angle compensation plate and a liquid crystal cell in a cross section in a thickness direction are designed to be approximately equal, and the pretilt angle is designed to be as small as possible.

However, in general, if a pretilt angle is too small, uniformity of falling directions of liquid crystal molecules upon voltage application becomes bad, leaving a possibility of display irregularity. Further, the shape of each segment of a liquid crystal display device of a segment display type is more complicated than that of a dot matrix type so that an oblique electric field is likely to be formed in various directions, particularly near at an edge. Because of this, a danger of display irregularity becomes high in the segment display type. It is effective to make a pretilt angle large to some extent, specifically 1° or larger (an inclination from a liquid crystal cell surface normal direction is 1° or larger), to suppress display irregularity even if oblique electric fields are formed.

However, in general, as a pretilt angle is set larger, sharpness of the transmissivity—applied voltage characteristics of a liquid crystal cell becomes gentle near at a threshold voltage. FIG. 30(A) shows the transmissivity—applied voltage characteristics at pretilt angles of 0.5° and 1.5° as viewed at a visual angle of 0° (as viewed in front of the cell), and FIG. 30(B) shows the transmissivity—applied voltage characteristics as viewed at a visual angle tilted to 45°. The characteristics at the pretilt angle of 1.50 (an angle of 88.5° relative to a liquid crystal substrate surface) has dull sharpness near at a threshold voltage than the characteristics at the pretilt angle of 0.5° (an angle of 89.50 relative to a liquid crystal substrate surface). Sharpness becomes dull, as the visual angle is tilted more.

Dull sharpness does not pose any problem in static driving such as a thin film transistor, since an off-voltage is smaller than a voltage at which sharpness becomes dull. However, in simple matrix driving at a ½ duty or larger, an off-voltage is just at the position of dull sharpness so that a transmissivity of an off-voltage applied segment (off-segment) becomes high corresponding in amount to the dull sharpness.

In segment display in particular, a transmissivity of an off-segment becomes higher than that of a nearby background so that a phenomenon that an off-segment can be viewed, i.e., a crosstalk, occurs and a display quality is degraded. A crosstalk becomes more conspicuous at a larger duty ratio (1/8 duty, 1/16 duty or higher), and becomes more serious at an increased display capacity (the increased number of display segments).

SUMMARY OF THE INVENTION

An object of the present invention is to provide a liquid crystal display device which has a vertically aligned liquid crystal cell to be simple-matrix driven and can perform good visual angle compensation even if a retardation of the liquid crystal cell in a cross section in a thickness direction is large.

According to one aspect of the present invention, there is provided a liquid crystal display device comprising: a first polarizing plate; a vertically aligned liquid crystal cell disposed above the first polarizing plate and having a liquid crystal layer having a retardation larger than 550 nm in a cross section in a thickness direction; a C plate disposed above the liquid crystal cell; a biaxial plate disposed above the C plate; a second polarizing plate disposed above the biaxial plate; and a control unit for simple-matrix driving the liquid crystal cell, wherein: the first and second polarizing plates are disposed in a positional relation of generally cross-Nicol; a pretilt angle is given to liquid crystal molecules in the liquid crystal layer in such a manner that a failing direction of the liquid molecules has in a display plane an angle of about 45° relative to both absorption axes of the first and second polarizing plates when a drive voltage is applied to the liquid crystal cell; and the biaxial plate is disposed in such a manner that an in-plane delay phase axis of the biaxial plate is generally perpendicular in the display plane to the absorption axis of the second polarizing plate.

The C plate and biaxial plate are disposed collectively on one side of the liquid crystal cell. The C plate is disposed on the liquid crystal cell side, and the biaxial plate is disposed on the polarizing plate side. Accordingly, even if the retardation of the liquid crystal cell in a cross section in a thickness direction is large, this retardation is compensated by the C plate and biaxial plate and the display quality is suppressed from being lowered at a deeper visual angle range.

According to another aspect of the present invention, there is provided a liquid crystal display device comprising: a first polarizing plate; a vertically aligned liquid crystal cell disposed above the first polarizing plate; a first biaxial plate disposed above the liquid crystal cell; a second biaxial plate disposed above the first biaxial plate; a second polarizing plate disposed above the second biaxial plate; and a control unit for simple-matrix driving the liquid crystal cell, wherein: the first and second polarizing plates are disposed in a positional relation of generally cross-Nicol; a pretilt angle is given to liquid crystal molecules in the liquid crystal layer in such a manner that a falling direction of the liquid molecules has in a display plane an angle of about 45° relative to both absorption axes of the first and second polarizing plates when a drive voltage is applied to the liquid crystal cell; and the second biaxial plate is disposed in such a manner that an in-plane delay phase axis of the second biaxial plate is generally parallel in the display plane to the absorption axis of the second polarizing plate, and the first biaxial plate is disposed in such a manner that an in-plane delay phase axis of the first biaxial plate is generally perpendicular in the display plane to the delay phase axis of the second biaxial plate.

The two biaxial plates are disposed on one side of the liquid crystal cell. The in-plane delay phase axis of the biaxial plate on the polarizing plate side is made generally parallel to the absorption axis of the polarizing plate, and the in-plane delay phase axis on the liquid crystal cell side is made generally perpendicular to the in-plane delay phase axis disposed on the polarizing plate side. Accordingly, even if the retardation of the liquid crystal cell in a cross section in a thickness direction is large, this retardation can be compensated and the display quality is suppressed from being lowered at a deeper visual angle range.

Another object of the present invention is to provide a liquid crystal display device of a vertically aligned type for segment display by simple-matrix driving, capable of suppressing a reduction in a display quality to be caused by a crosstalk even if a pretilt angle is made large to some extent.

According to still another aspect of the present invention, there is provided a liquid crystal display device comprising: a first polarizing plate including a first polarizer; a vertically aligned liquid crystal cell for segment display disposed above the first polarizing plate and including a liquid crystal layer; a second polarizing plate including a second polarizer and disposed above the liquid crystal cell; a visual angle compensation member disposed at least either between the first polarizing plate and the liquid crystal cell or between the liquid crystal cell and the second polarizing plate; and a control unit for simple-matrix driving the liquid crystal cell, wherein a total value of retardations of the visual angle compensation member, the first polarizing plate and the second polarizing plate in a cross section in a thickness direction, from a surface of the first polarizer on a liquid crystal cell side to a surface of the second polarizer on the liquid crystal cell side, has a positive or negative sign opposite to, and an absolute value larger than, a retardation of the liquid crystal layer in a cross section in a thickness direction.

The total value of retardations of the visual angle compensation member, the first polarizing plate and the second polarizing plate in a cross section in a thickness direction, from a surface of the first polarizer on a liquid crystal cell side to a surface of the second polarizer on the liquid crystal cell side, has a positive or negative sign opposite to, and an absolute value larger than, the retardation of the liquid crystal layer in a cross section in a thickness direction. Accordingly, it is possible to suppress the display quality from being degraded by crosstalk to be caused when the liquid crystal cell is simple-matrix driven.

BRIEF DESCRIPTION OF THE DRAWINGS

FIG. 7 is a schematic diagram of a liquid crystal display device of a modification of the second embodiment, drawn by rearranging schematic plan views of constituent members such as a back polarizing plate in the order of positions in a thickness direction.

FIG. 20 is a schematic diagram of the liquid crystal display device of the sixth comparative example, drawn by rearranging schematic plan views of constituent members such as a back polarizing plate in the order of positions in a thickness direction.

FIG. 21 is a schematic diagram of the liquid crystal display device of the seventh comparative example, drawn by rearranging schematic plan views of constituent members such as a back polarizing plate in the order of positions in a thickness direction.

FIG. 22 is a schematic cross sectional view of a liquid crystal display device according to a sixth (or seventh) embodiment of the present invention.

DESCRIPTION OF THE PREFERRED EMBODIMENTS

First, description will be made on a liquid crystal display device capable of providing good visual angle compensation even if a retardation of a liquid crystal cell in a cross section in a thickness direction is large.

Figure 1:
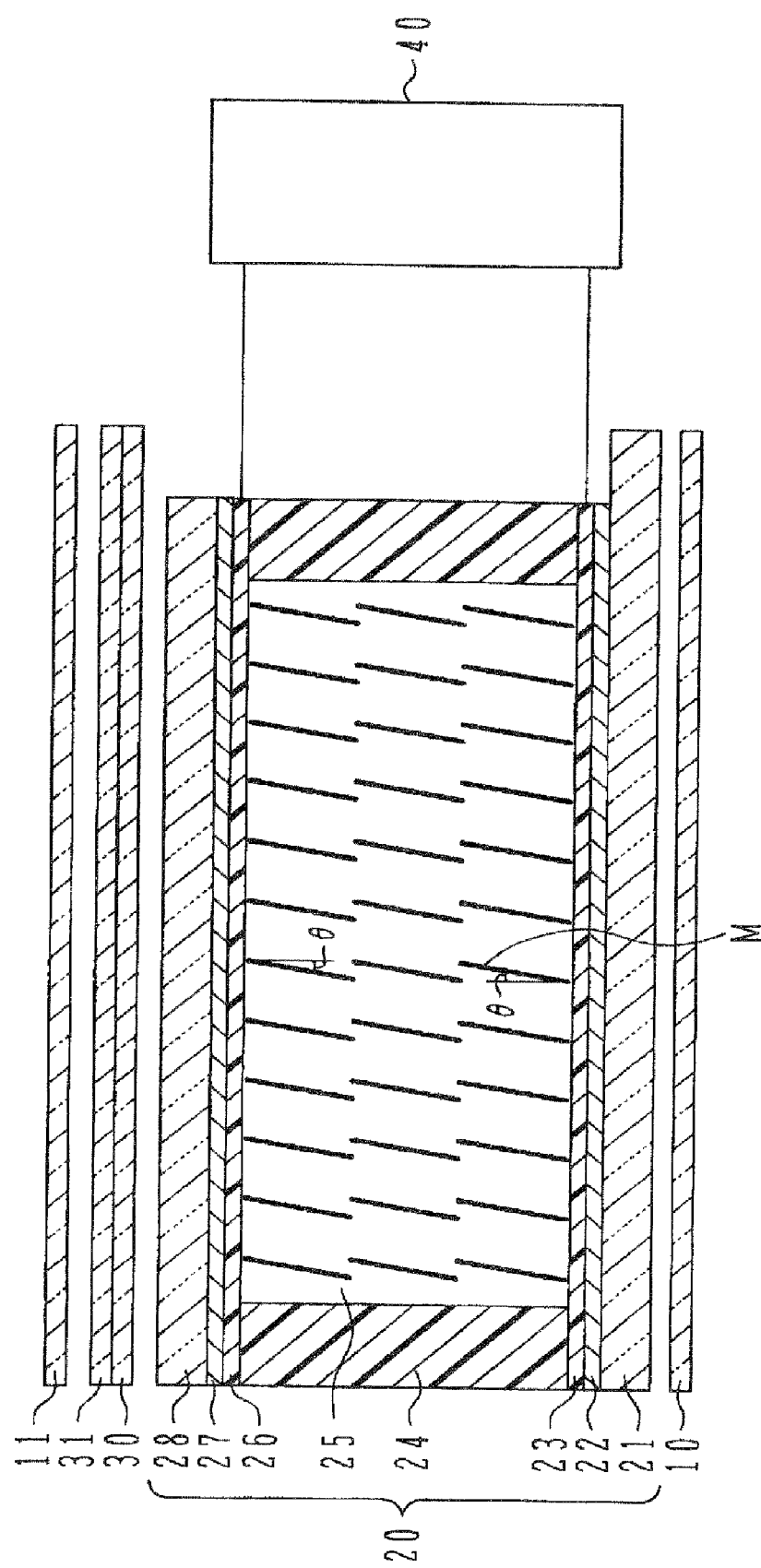
FIG. 1 is a schematic cross sectional view of a liquid crystal display device according to a first embodiment of the present invention.
Figure 2:
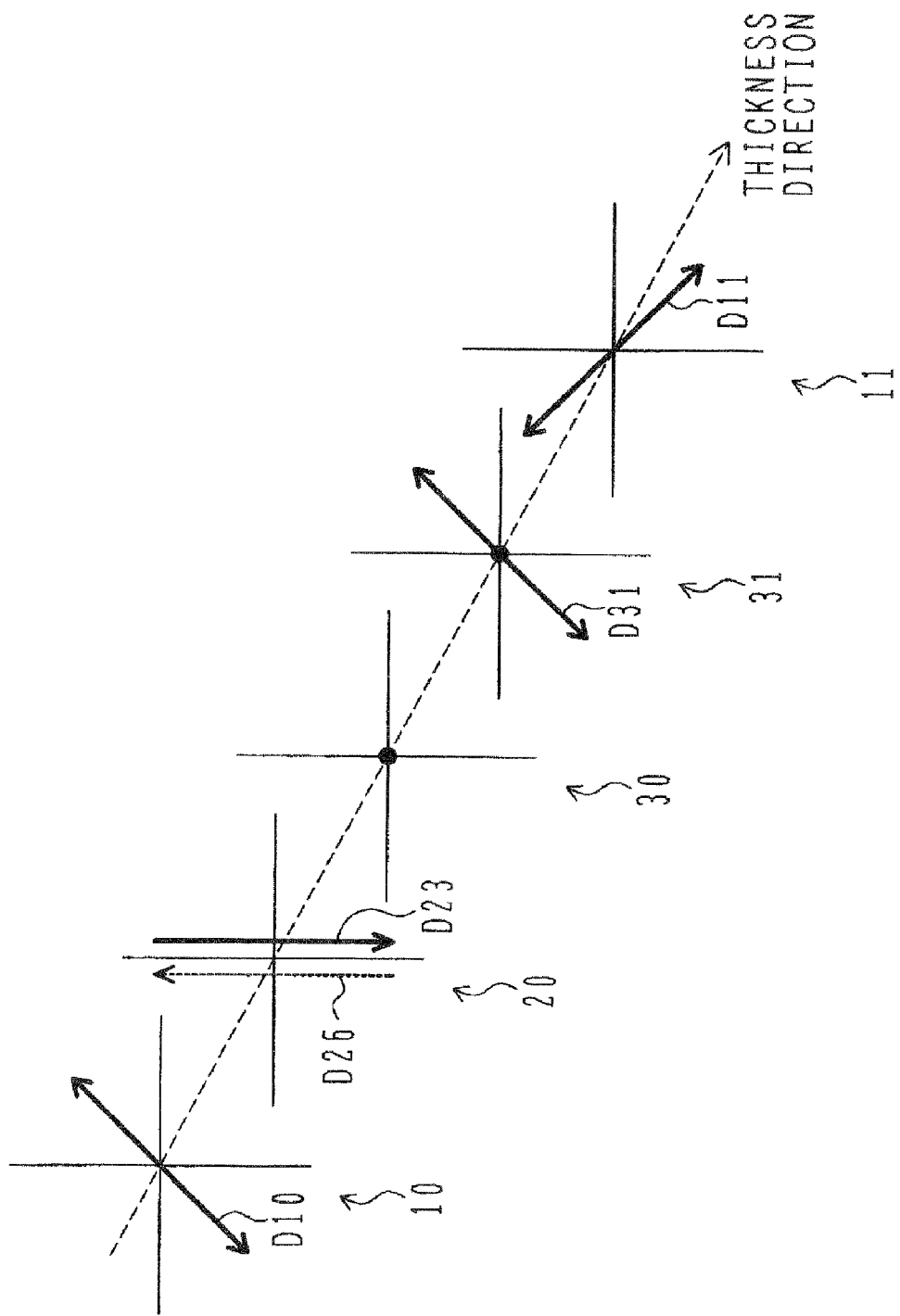
FIG. 2 is a schematic diagram of the liquid crystal display device of the first embodiment, drawn by rearranging schematic plan views of constituent members such as a back polarizing plate in the order of positions in a thickness direction.

A liquid crystal display device according to the first embodiment of the present invention will be described with reference to FIGS. 1 and 2. FIG. 1 is a schematic cross sectional view of the liquid crystal display device of the first embodiment. A vertically aligned liquid crystal cell 20 is disposed between a back polarizing plate 10 and a front polarizing plate 11. A back light is disposed, for example, outside (on the lower side in FIG. 1) the back polarizing plate 10.

The structure of the liquid crystal cell 20 will be described. A lower transparent electrode 22 is formed on the upper surface of a lower transparent substrate 21, and a lower alignment film 23 is formed on the upper surface of the lower transparent electrode 22. An upper transparent electrode 27 is formed on the lower surface of an upper transparent substrate 28, and an upper alignment film 26 is formed on the lower surface of the upper transparent electrode 27. A liquid crystal layer 25 is sandwiched between the confronting lower alignment film 23 and upper alignment film 26, and a seal member 24 seals the liquid crystal layer 25. A diameter of a gap control member determining a cell thickness is 4 µm.

The lower and upper alignment films 23 and 26 are made of, for example, vertically aligned films SE-1211 manufactured by Nissan Chemical Industries, Ltd. By rubbing the lower and upper alignment films 23 and 26 with a rubbing cloth made of, for example, rayon, a pretilt angle θ is given in such a manner that liquid crystal molecules M fall in a rubbing direction.

The liquid crystal layer 25 is made of liquid crystal material having negative dielectric constant anisotropy (liquid crystal molecules fall from a vertical direction upon voltage application) and a birefringence Δn of 0.14, manufactured by, for example, Merck Ltd. Since the cell thickness is 4 µm and the birefringence Δn is 0.14, a retardation of the liquid crystal cell 20 in a cross section in a thickness direction is 560 nm. The liquid crystal cell 20 has a positive retardation in a cross section in a thickness direction.

The liquid crystal cell 20 performs segment display and is simple-matrix driven at a high duty ratio 1/N (N is 4 or larger at a ratio of 1:N). The lower and upper transparent electrodes 22 and 27 have patterns corresponding to a display pattern, and are connected to a control device 40. The control device 40 supplies drive signals to control a display state.

As a duty ratio increases in simple matrix driving, a ratio between an on-voltage and an off-voltage lowers. Therefore, in order to perform good on/off operation, a change of a transmissivity with a voltage change is required to be steep.

As a retardation of a vertically aligned liquid crystal cell in a cross section in a thickness direction of is made large, a change of a transmissivity with a voltage change can be made steep. A retardation in a cross section in a thickness direction can be made large at least either by making thick the liquid crystal layer and or by making large the birefringence Δn of liquid crystal material.

For a liquid crystal cell of a vertically aligned type performing simple matrix driving at a high duty ratio 1/N (N is 4 or larger), it is preferable to set a retardation in a cross section in a thickness direction larger than 550 nm, and more preferable to larger than 555 nm. The retardation of the liquid crystal cell in a cross section in a thickness direction has no specific upper limit.

Examples of segment display by simple matrix driving may be audio display (display of a setting state such as a frequency), air conditioner display (display of a setting state such as a temperature), odotrip display in a car meter (distance) and the like, including 7-segment display (character 8).

A visual angle compensation member stacking one C plate and one biaxial plate is inserted between the liquid crystal cell 20 and front polarizing plate 11. The C plate 30 is disposed on the liquid crystal cell 20 side and the biaxial plate 31 is disposed on the front polarizing plate 11.

The C plate 30 has three primary refractive indices, one refractive index $n_z$ in a surface normal direction (a direction parallel to a normal direction of a display plane of the liquid crystal cell 20) and two indices $n_x$ and $n_y$ in an in-plane (in-plane parallel to the display plane of the liquid crystal cell 20), where a relation of $n_x=n_y>n_z$ is satisfied.

The biaxial plate 31 has three primary refractive indices, one refractive index $n_z$ in a surface normal direction and two indices $n_x$ and $n_y$ in an in-plane, where a relation of $n_x>n_y>n_z$ is satisfied.

The C plate 30 has a negative retardation having a magnitude of 220 nm in a cross section in a thickness direction. The biaxial plate 31 has a negative retardation having a magnitude of 220 nm in a cross section in a thickness direction. The magnitude of the retardation of the C plate in a cross section in a thickness direction is calculated by multiplying a thickness of the C plate by a difference between the in-plane refractive index $n_x(=n_y)$ and a surface normal direction refractive index $n_z$. The magnitude of the retardation of the biaxial plate in a cross section in a thickness direction is calculated by multiplying a thickness of the biaxial plate by a difference between an average value $(n_x+n_y)/2$ of the two in-plane refractive indices $n_x$ and $n_y$ and a surface normal direction refractive index $n_z$.

An in-plane retardation of the biaxial plate 31 is 50 nm. The magnitude of the in-plane retardation of the biaxial plate is calculated by multiplying a thickness of the biaxial plate by a difference between one in-plane refractive index $n_x$ and the other in-plane refractive index $n_y$.

The back polarizing plate 10 and front polarizing plate 11 have the structure that a polarizer film is protected by a triacetylcellulose (TAC) film. A TAC film contained in each polarizing plate has a negative retardation having a magnitude of about 60 nm in a cross section in a thickness direction.

A member constituted of the C plate 30, biaxial plate 31, back polarizing plate 10 and front polarizing plate 11 has a negative retardation having a magnitude of 560 nm (220 nm+220 nm+60 nm+60 nm) in a cross section in a thickness direction.

The retardation of the liquid crystal cell in a cross section in a thickness direction can be compensated by setting the retardation of the visual angle compensation member and the polarizing plates in a cross section in a thickness direction to have the opposite positive or negative sign to that, and generally the same absolute value as that, of those of the retardation of the liquid crystal cell in a cross section in a thickness direction.

Next, with reference to FIG. 2, description will be made on an absorption axis direction of the back polarizing plate 10, rubbing directions of the lower and upper alignment films of the liquid crystal cell 20, an optical axis of the C plate 30, a delay phase axis direction of the biaxial plate 31, and an absorption axis direction of the polarizing plate 11. FIG. 2 is a schematic view of the liquid crystal display device of the first embodiment, drawn by rearranging the schematic plan views of constituent members such as the back polarizing plate 10 in the order of positions in a thickness direction.

Absorption axes D10 and D11 of the back polarizing plate 10 and front polarizing plate 11 are generally perpendicular to each other in the display plane. Namely, the back polarizing plate 10 and front polarizing plate 11 are generally crossed- Nicol disposed. If an angle between two directions is in a range from 80° to 100°, the phrase "generally crossed-Nicol disposed" is used.

A rubbing direction D23 of the lower alignment film 23 of the liquid crystal cell 20 and a rubbing direction D26 of the upper alignment film 26 are mutually antiparallel. The rubbing directions D23 and D26 have approximately an angle of 45° in the display plane relative to both the absorption axis directions D10 and D11 of the polarizing plates 10 and 11. Namely, the direction of liquid crystal molecules falling when a drive voltage is applied has approximately an angle of 45° relative to the absorption axes of both the polarizing plates A range from 35° to 55° is called "approximately an angle of 45°".

An optical axis of the C plate 30 is parallel to the surface normal direction. The in-plane delay phase axis direction (direction corresponding to the in-phase maximum refractive index $n_x$) D31 of the biaxial plate 31 is generally perpendicular in the display plane to the absorption axis D11 of the adjacent front polarizing plate 11.

The C plate and biaxial plate are formed by drawing a film made of organic resin. Organic resin as the material of the C plate and biaxial plate may be polyethylene, polypropylene, norbornene, polyvinyl chloride, cellulose ester, polystyrene, acrylonitrile-butadiene-styrene copolymer resin (ABS resin), acrylonitrile-styrene copolymer resin (AS resin), polymethyl methacrylate, polyvinyl acetate, polyvinyl chloride, polyamide, polyacetal, polycarbonate, denatured polyphenylene ether, polybutylene terephthalate, polyethylene terephthalate, polyphenylene sulfide, polysulfone, polyestersulfone, polyether etherketone, polyallylate, liquid crystal polymer, polyamide-imide, polyimide, polytetrafluoroethylene and the like.

As a method of forming the C plate and biaxial plate, a drawing process is presently used widely. However, with this method, a magnitude of a retardation of each of the C plate and biaxial plate in a cross section in a thickness direction is, for example, about 270 nm at a maximum. When considering a stable mass production of the C plate and biaxial plate, a magnitude of a retardation is about 250 nm at a maximum.

As described above, a retardation of a liquid crystal cell in a cross section in a thickness direction is preferable set larger than 550 nm. Therefore, in order to compensate the retardation of this liquid crystal cell, two or more visual angle compensation plates are used as in this embodiment.

Next, a liquid crystal display device of a first comparative example will be described. The first comparative example differs from the first embodiment in the arrangement of visual angle compensation plates. The other structures are similar to those of the first embodiment.

The device of the first comparative example has the structure that the C plate 30 of the apparatus of the first embodiment shown in FIG. 1 is moved to between the back polarizing plate 10 and liquid crystal cell 20. Namely, the first comparative example has the structure that the C plate and biaxial plate are disposed each on both sides (on the back polarizing plate side and on the front polarizing plate side) of the liquid crystal cell. The device of the first embodiment has the structure that the C plate and biaxial plate are disposed on one side (on the front polarizing plate side) of the liquid crystal cell.

Figure 3:
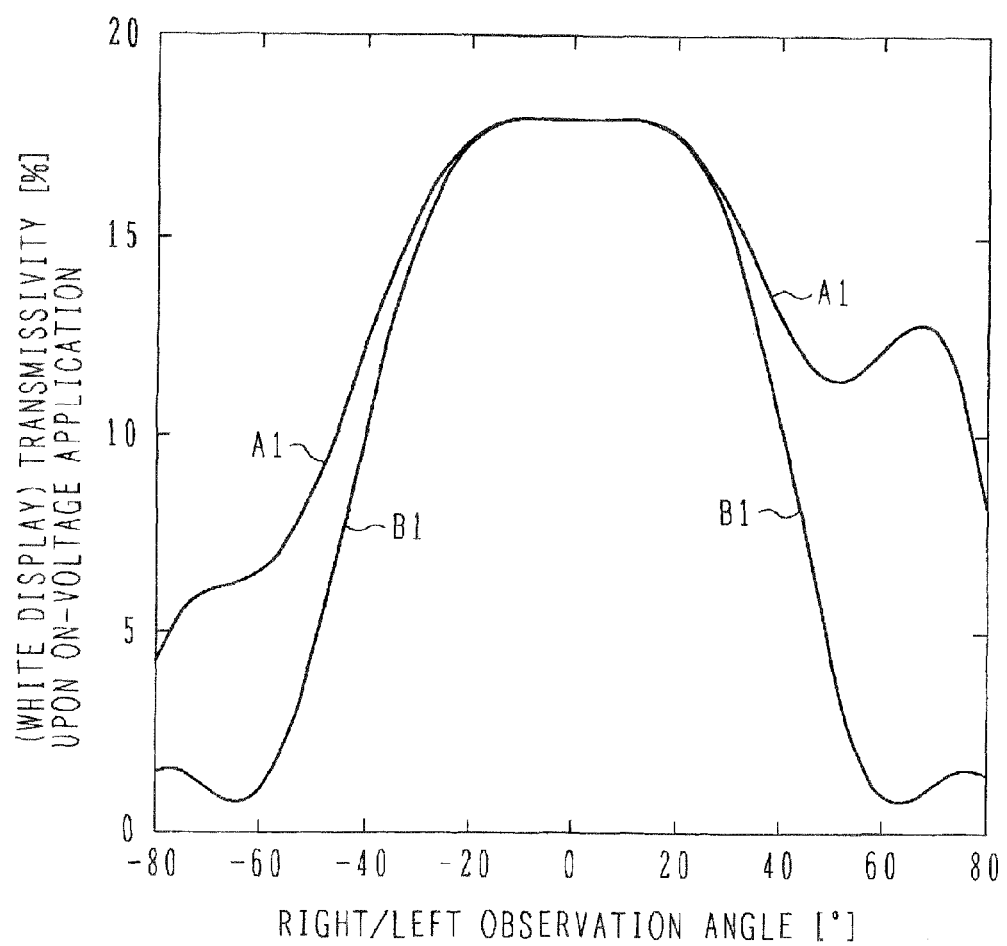
FIG. 3 is a graph showing the visual angle characteristics of a white display transmissivity upon on-voltage application of liquid crystal display devices of the first embodiment and a first comparative example.

Next, with reference to FIG. 3, description will be made on the visual angle characteristics of the liquid crystal display devices of the first embodiment and first comparative example. FIG. 3 is a graph showing a white display transmissivity upon application of an on-voltage. The abscissa represents a right/left observation angle in the unit of degree, and the ordinate represents a transmissivity in the unit of %. Curves A1 and B1 indicate the visual angle characteristics of the first embodiment and first comparative example, respectively.

Both the first embodiment and first comparative example have a tendency that a transmissivity lowers at a deeper visual angle both right and left. However, a degree of reduction is smaller for the embodiment. Namely, the embodiment has better white display at a deep visual angle. A difference therebetween becomes conspicuous in a range of a visual angle magnitude of about 30° or larger both right and left.

The visual angle compensation plates are disposed on both sides of the liquid crystal cell in the comparative example, whereas the visual angle compensation plates are disposed on one side of the liquid crystal cell in the embodiment. Therefore, the visual angle characteristics of the comparative example is asymmetric right and left, whereas the visual angle characteristics of the embodiment is symmetric right and left.

It can be seen from the visual angle characteristics of a white display transmissivity upon application of an on-voltage, that if two visual angle compensation plates, C plate and biaxial plate, are used, it is more preferable to dispose two visual angle compensation plates on one side of the liquid crystal cell than to dispose two plates separately on both sides of the liquid crystal cell.

Next, description will be made on liquid crystal display devices of second and third comparative examples. The second and third comparative examples are similar to the first embodiment in that two visual angle compensation plates are disposed collectively on one side of the liquid crystal cell, but the types of visual angle compensation plates are different from those of the first embodiment.

In the device of the second comparative example, the visual angle compensation plate disposed on the front polarizing plate 11 side of the device of the first embodiment shown in FIG. 1 is replaced with a C plate without using the biaxial plate. Namely, two visual angle compensation plates inserted between the liquid crystal cell 20 and front polarizing plate 11 are both replaced with C plates. A retardation of the C plate replacing the biaxial plate, in a cross section in a thickness direction, is 220 nm similar to the biaxial plate of the first embodiment. In the device of the third comparative example, the visual angle compensation plate disposed on the liquid crystal cell 20 side of the device of the first embodiment shown in FIG. 1 is replaced with a biaxial plate without using the C plate. Namely, two visual angle compensation plates inserted between the liquid crystal cell 20 and front polarizing plate 11 are both replaced with biaxial plates. A retardation of the biaxial plate replacing the C plate, in a cross section in a thickness direction, is 220 nm similar to that of the biaxial plate of the first embodiment. An in-plane retardation of each biaxial plate is 25 nm, and an in-plane total retardation of the two biaxial plates is 50 nm.

Figure 9:
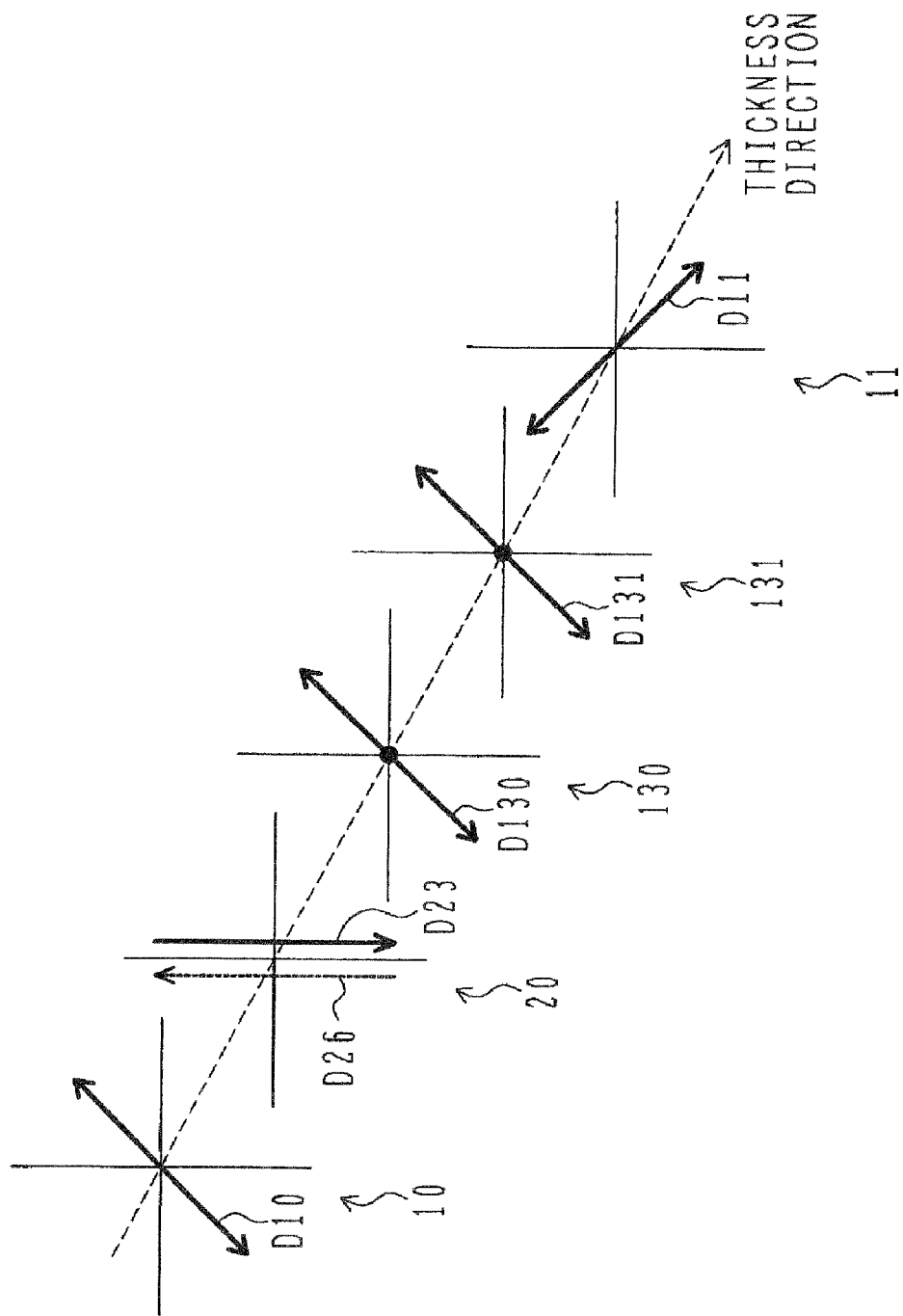
FIG. 9 is a schematic diagram of the liquid crystal display device of the third comparative example, drawn by rearranging schematic plan views of constituent members such as a back polarizing plate in the order of positions in a thickness direction.

With reference to FIG. 9, description will be made on the arrangement of two biaxial plates of the device of the third comparative example. Similar to FIG. 2, FIG. 9 is a schematic diagram of the liquid crystal display device of the third comparative example, drawn by rearranging schematic plan views of constituent members such as the back polarizing plate 10 in the order of positions in a thickness direction.

A biaxial plate 130 is disposed on the liquid crystal cell 20 side, and a biaxial plate 131 is disposed on the front polarizing plate 11 side. A delay phase axis direction D130 of the biaxial plate 130 is parallel in a display plane to a delay phase axis direction D131 of the biaxial plate 131. Both the delay phase axis directions D130 and D131 of the biaxial plates 130 and 131 are perpendicular to the absorption axis D11 of the front polarizing plate 11.

Figure 4:
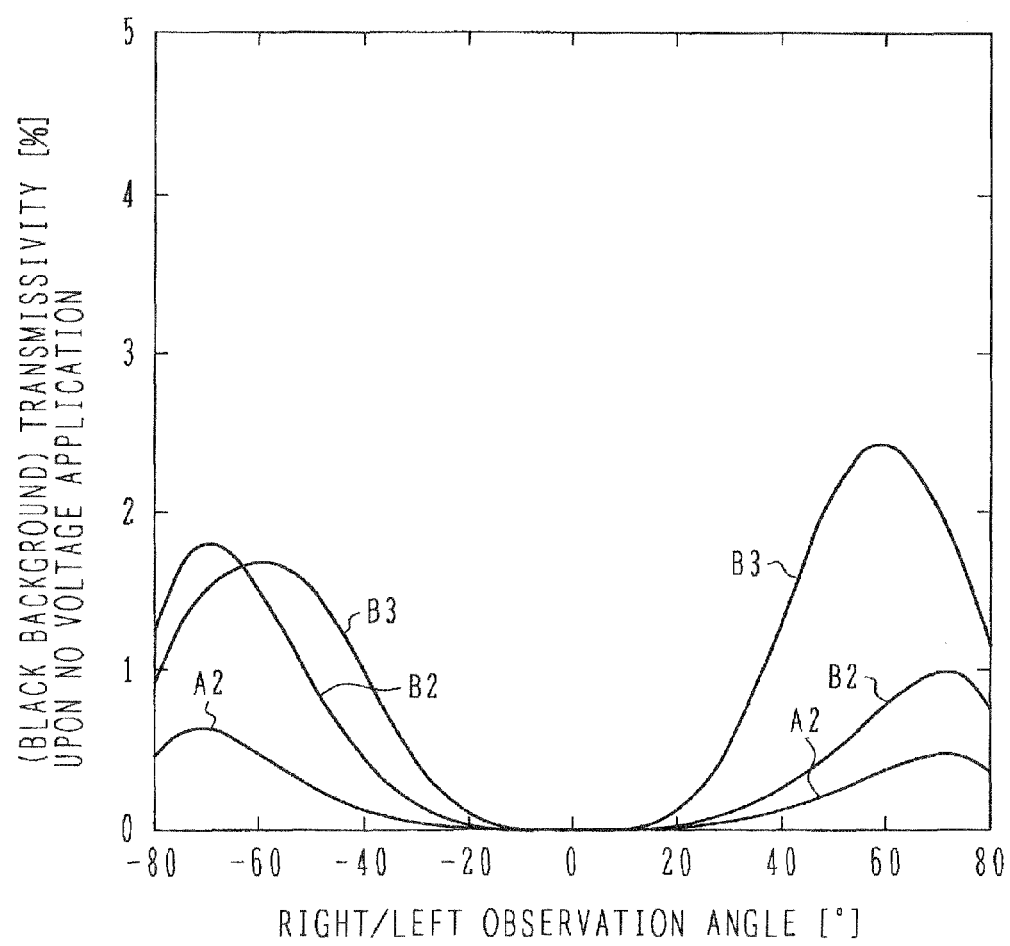
FIG. 4 is a graph showing the visual angle characteristics of a black background transmissivity upon no voltage application of liquid crystal display devices of the first embodiment and a second comparative example and a third comparative example.

Next, with reference to FIG. 4, description will be made on the visual angle characteristics of the liquid crystal display devices of the first embodiment and second and third comparative examples FIG. 4 is a graph showing a black background transmissivity upon application of no voltage. The abscissa represents a right/left observation angle in the unit of degree, and the ordinate represents a transmissivity in the unit of %. Curves A2, B2 and B3 indicate the visual angle characteristics of the first embodiment and second and third comparative examples, respectively.

All the first embodiment and second and third comparative examples have a tendency that a transmissivity increases at a deeper visual angle both right and left. However, a degree of increase is smallest for the embodiment. Namely, the embodiment device performs best black display at a deep visual angle. A difference between the embodiment and comparative examples becomes conspicuous in a range of a visual angle magnitude of about 20° or larger both right and left.

Although the visual angle characteristics are asymmetric right and left for the embodiment and comparative examples, the asymmetry degree is smallest for the embodiment. Namely, the device of the embodiment has a suppressed right/left variation of the black display in a deep visual angle range.

It can be seen from the visual angle characteristics of a black background transmissivity upon application of no voltage, that if two visual angle compensation plates are disposed collectively on one side of the liquid crystal cell, it is preferable to use one as a C plate and the other as a biaxial plate.

In the first embodiment, the C plate is disposed on the liquid crystal cell side, and the biaxial plate is disposed on the front polarizing plate side. This arrangement is more preferable than the biaxial plate is disposed on the liquid crystal side and the C plate is disposed on the front polarizing plate side. By disposing the biaxial plate adjacent to the polarizing plate, it is possible to compensate a change in the optical characteristics with an increased angle between the absorption axes of two polarizing plates to be caused at a deep visual angle.

As described above, if two visual angle compensation plates are required, the C plate and biaxial plate are disposed collectively on one side of the liquid crystal cell, with the C plate being disposed on the liquid crystal cell side and the biaxial plate being disposed on the polarizing plate side.

Next, with reference to FIG. 5, a liquid crystal display device of the second embodiment will be described. In the second embodiment, since a retardation of the liquid crystal cell in a cross section in a thickness direction is large, it is necessary to use three visual angle compensation plates.

Figure 5:
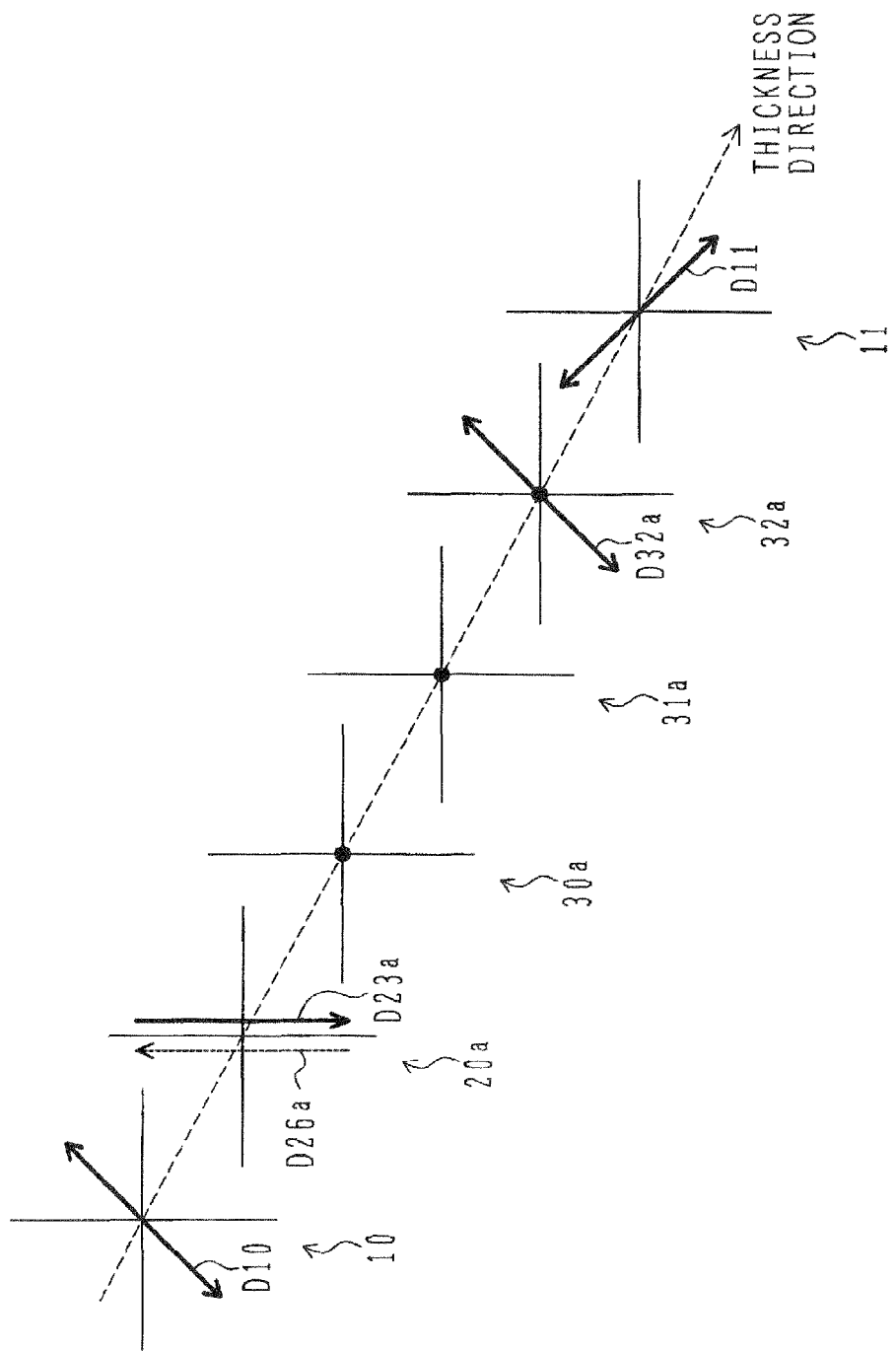
FIG. 5 is a schematic diagram of a liquid crystal display device of a second embodiment, drawn by rearranging schematic plan views of constituent members such as a back polarizing plate in the order of positions in a thickness direction.

FIG. 5 is a schematic diagram of the liquid crystal display device of the second embodiment, drawn by rearranging schematic plan views of constituent members such as the back polarizing plate 10 in the order of positions in a thickness direction. A vertically aligned liquid crystal cell 20a is disposed between the back polarizing plate 10 and front polarizing plate 11.

Similar to the first embodiment, the back polarizing plate 10 and front polarizing plate 11 are crossed-Nicol disposed. Rubbing directions D23a and D26a for the lower alignment film and upper alignment film of the liquid crystal cell 20a are antiparallel to each other, and have an angle of about 45° relative to both the absorption axis directions D10 and D11 of the polarizing plates 10 and 11.

In the first embodiment, the cell thickness is 4 μm, the birefringence Δn of liquid crystal material is 0.14, and the retardation of the liquid crystal cell in a cross section in a thickness direction is 560 nm. In the second embodiment, a cell thickness is 5 μm, a birefringence Δn of liquid crystal material is 0.156, and a retardation of the liquid crystal cell 20a in a cross section in a thickness direction is 780 nm. As the liquid crystal material, material manufactured, for example, by Merck Ltd., may be used.

The device of the second embodiment has three visual angle compensation plates inserted between the liquid crystal cell 20a and front polarizing plate 11. A C plate 30a, a C plate 31a and a biaxial plate 32a are disposed in this order from the liquid crystal cell 20a side.

The C plates 30a and 31a have each a negative retardation having a magnitude of 220 nm in a cross section in a thickness direction. The biaxial plate 32a has a negative retardation having a magnitude of 220 nm in a cross section in a thickness direction. An in-plane retardation of the biaxial plate 32a is 50 nm. Similar to the first embodiment, an in-plane delay phase axis direction D32a of the biaxial plate 32a is approximately perpendicular in the display plane to the absorption axis direction D11 of the adjacent front polarizing plate 11.

A member constituted of the two C plates 30a and 31a, biaxial plate 32a, back polarizing plate 10 and front polarizing plate 11 has a negative retardation having a magnitude of 780 nm (220 nm+220 nm+220 nm+60 nm+60 nm) in a cross section in a thickness direction. In this way, the retardation of the liquid crystal cell in a cross section in a thickness direction can be compensated.

Similar to the first embodiment, the device of the second embodiment has a structure that a plurality of visual angle compensation plates are disposed collectively on one side of the liquid crystal cell, with the C plates being disposed on the liquid crystal cell side and the biaxial plate on the front polarizing plate side. Since the retardation of the liquid crystal cell in a cross section in a thickness direction is large the retardation of the liquid crystal cell is compensated by the stacked two C plates and one biaxial plate.

Figure 10:
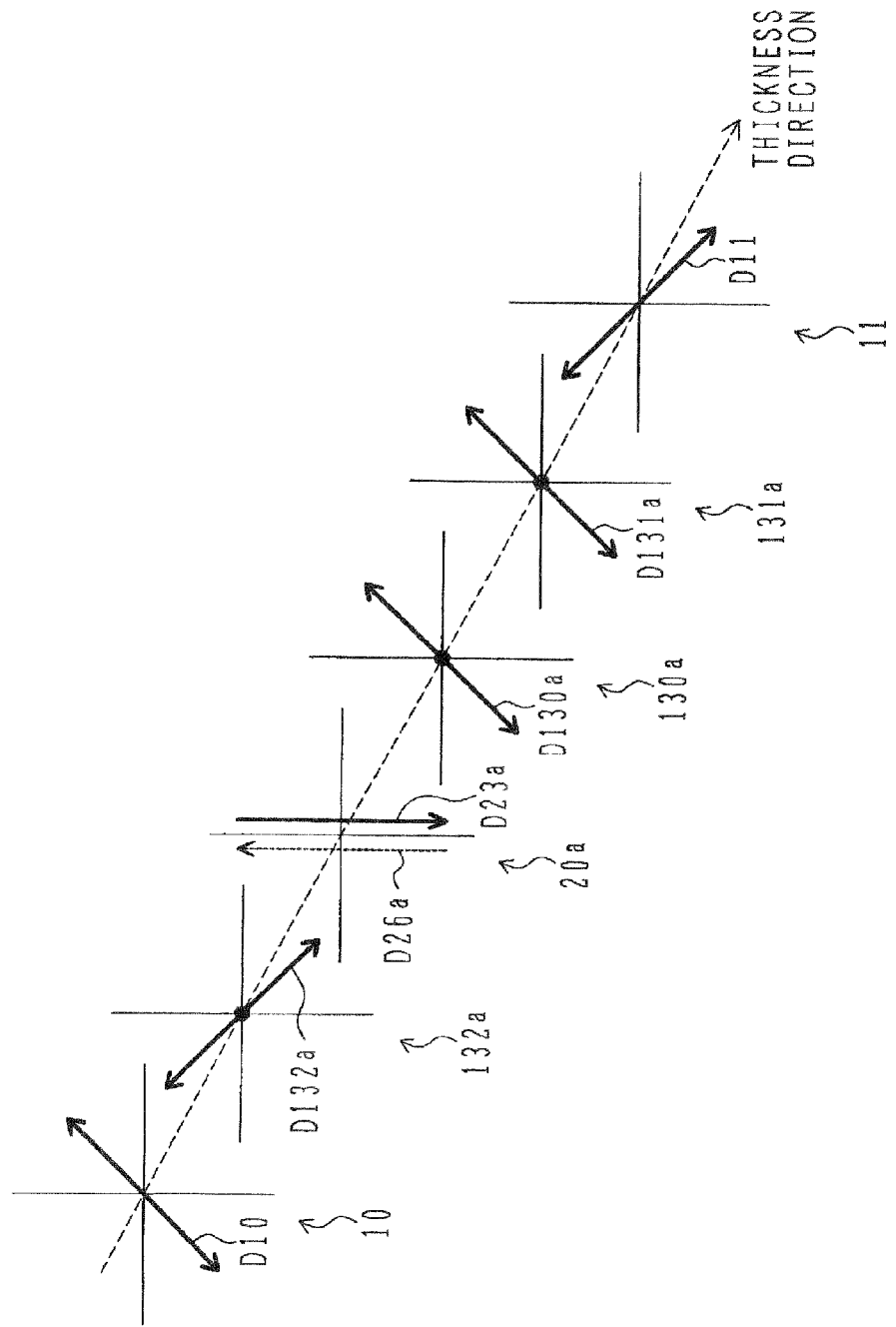
FIG. 10 is a schematic diagram of the liquid crystal display device of the fourth comparative example, drawn by rearranging schematic plan views of constituent members such as a back polarizing plate in the order of positions in a thickness direction.

Next, with reference to FIG. 10, the liquid crystal display device of a fourth comparative example will be described. The fourth comparative example is similar to the second embodiment in that three visual angle compensation plates are used. However, it is different from the second embodiment in that three visual angle compensation plates are all biaxial plates. The structures other than the visual angle compensation plates are similar to those of the second embodiment. FIG. 10 is a schematic diagram of the liquid crystal display device of the fourth comparative example, drawn by rearranging schematic plan views of constituent members such as the back polarizing plate 10 in the order of positions in a thickness direction.

Biaxial plates 130a and 131a are disposed between the liquid crystal cell 20a and front polarizing plate 11. The two biaxial plates 130a and 131a are disposed in such a manner that a delay phase axis direction D130a of the biaxial plate 130a and a delay phase axis direction D131a of the biaxial plate 131a are parallel to each other in the display plane and that both the delay phase axis directions D130a and D131a are perpendicular to the absorption axis direction D11 of the front polarizing plate 11.

The third biaxial plate 132a is disposed between the back polarizing plate 10 and liquid crystal cell 20a. The biaxial plate 132a is disposed in such a manner that a delay phase axis direction D132a of the biaxial plate 132a is perpendicular to the absorption axis direction D10 of the back polarizing plate 10 in the display plane.

Similar to each visual compensation plate of the second embodiment, each of the biaxial plates 130a to 132a has a retardation of 220 nm in a cross section in a thickness direction. An in-plane retardation of each of the biaxial plates 130a and 131a is 25 nm, and a total in-plane retardation of the visual angle compensation member constituted of the biaxial plates 130a and 131a is 50 nm. An in-plane retardation of the biaxial plate 132a is 50 nm.

In the fourth comparative example, three biaxial plates are disposed collectively on one side of the liquid crystal cell. This is because it is difficult to set the in-plane retardation of each biaxial plate as small as 20 nm or smaller from the viewpoint of mass production and the like.

Figure 6:
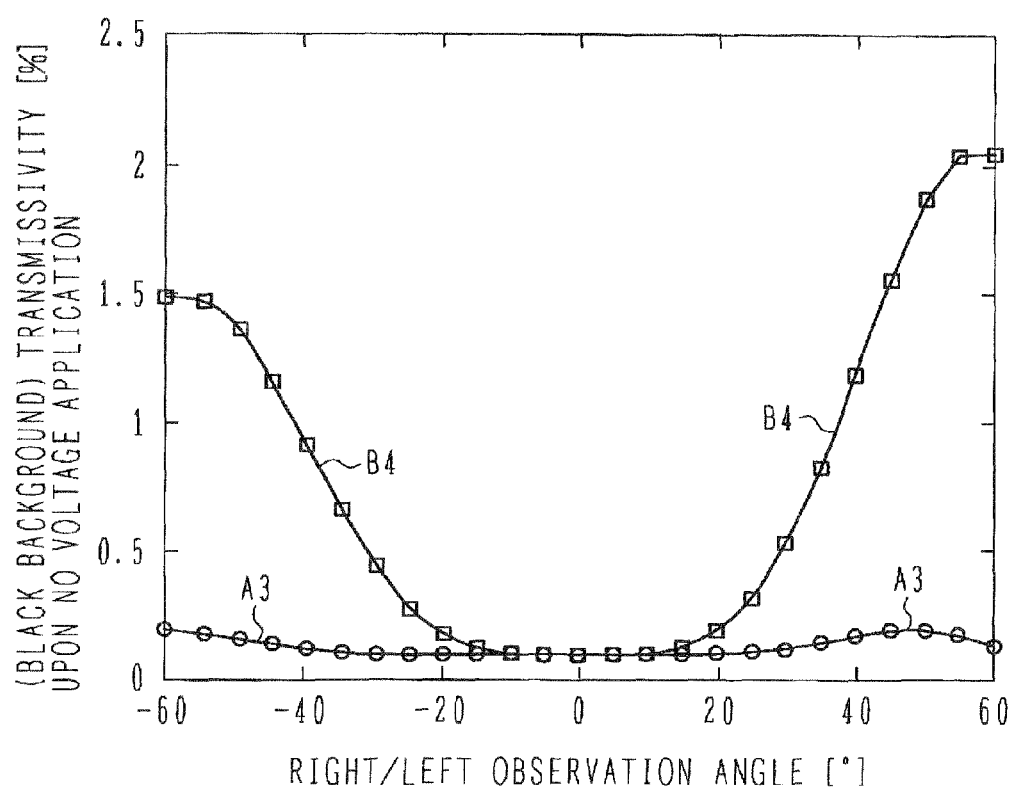
FIG. 6 is a graph showing the visual angle characteristics of a black background transmissivity upon no voltage application of liquid crystal display devices of the second embodiment and a fourth comparative example.

Next, with reference to FIG. 6, description will be made on the visual angle characteristics of the liquid crystal display devices of the second embodiment and fourth comparative example. FIG. 6 is a graph showing the visual angle characteristics of a black background transmissivity upon application of no voltage. The abscissa represents a right/left observation angle in the unit of degree, and the ordinate represents a transmissivity in the unit of %. Curves A3 and B4 indicate the visual angle characteristics of the second embodiment and fourth comparative example, respectively.

Both the second embodiment and fourth comparative example have a tendency that a transmissivity increases at a deeper visual angle both right and left. However, a degree of increase is much more smaller for the embodiment. Namely, the embodiment has better black display at a deep visual angle. A difference therebetween becomes conspicuous in a range of a visual angle magnitude of about 15° or larger both right and left.

Although the visual angle characteristics are asymmetric right and left for the embodiment and comparative example, the degree of asymmetry is smaller in the embodiment. Namely, the device of the embodiment has a suppressed right/left variation of the black display in a deep visual angle range.

As described above, if a retardation of the liquid crystal cell is large and three visual angle compensation plates are required, the visual angle compensation plates are disposed collectively on the liquid crystal cell side by disposing a stack of two C plates on the side of the liquid crystal cell and one biaxial plate on the side of the polarizing plate. In this way, it becomes possible to obtain a liquid crystal display device having good visual angle characteristics.

Next, with reference to FIG. 7, description will be made on a liquid crystal display device according to a modification of the second embodiment. FIG. 7 is a schematic diagram of the liquid crystal display device of the modification, drawn by rearranging schematic plan views of constituent members such as the back polarizing plate 10 in the order of positions in a thickness direction.

This modification has a structure that in place of the two C plates of the second embodiment, one optical plate 30b is disposed which has the same retardation (440 nm) in a cross section in a thickness direction as that of the two C plates. The other structures are similar to those of the second embodiment.

The optical plate 30b is made of cholesteric liquid crystal polymer having a twist pitch shorter than a visual wavelength. It is known that the optical plate of this structure operates optically equivalent to the C plate. By properly setting a birefringence of cholesteric liquid crystal and a thickness of a liquid crystal layer, it is possible to manufacture a visual angle compensation plate having a large retardation unable to obtain by a drawing process of organic resin such as norbornene based resin.

The visual angle characteristics of the black background transmissivity upon application of no voltage are approximately coincident with those of the second embodiment (refer to curve A3 shown in FIG. 6).

As described above, if a retardation of a vertically aligned liquid crystal cell is large, the visual angle compensation plates are disposed collectively on the liquid crystal cell side by disposing the C plate on the side of the liquid crystal cell and the biaxial plate on the side of the polarizing plate. In this way, it becomes possible to obtain a liquid crystal display device having good visual angle characteristics. It is preferable that the in-plane delay phase axis of the biaxial plate is perpendicular to the absorption axis of the adjacent polarizing plate.

If the retardation of a liquid crystal cell in a cross section in a thickness direction cannot be compensated even if one C plate and one biaxial plate are used, it is effective to use a stack of a plurality of C plates to increase the retardation in a cross section in a thickness direction. As the C plate, not only a C plate formed by a drawing process of organic resin, but also an optical plate made of cholesteric liquid crystal may be used.

In the above embodiments, a biaxial plate is used which has a retardation of 220 nm in a cross section in a thickness direction and an in-plane retardation of 50 nm. In order to study a preferable range of the in-plane retardation of a biaxial plate, devices having a similar structure to that of the first embodiment were formed by changing the in-plane retardation of each biaxial plate. The in-plane retardations were set to 50 nm, as well as 40 nm, 60 nm, 80 nm, 100 nm, 120 nm and 140 nm.

Displays of these devices were visually observed. The devices having the in-plane retardations of 40 nm, 50 nm and 60 nm were excellent in the visual angle characteristics including a tone change, and the devices having the in-plane retardations of 120 nm and 140 nm were poor in quality because a tone change and a rise in a transmissivity were observed in a deep visual angle range. Although the devices having the in-plane retardations of 80 nm and 100 nm have quality inferior to that of the devices having the in-plane retardations of 40 nm to 60 nm, this quality was within an allowable range. It has been found from these that the in-plane retardation of the biaxial plate is preferably 100 nm or smaller and more preferably 60 nm or smaller.

The liquid crystal display device of the above embodiments can present good display in a wide visual angle range from a shallow visual angle to a deep visual angle. The liquid display device of this type is suitable for, for example, a display panel of a vehicle mount apparatus such as a car audio set, a display panel of a business machine such as a copy machine and a facsimile machine, and the like. In the above-described embodiments, although the good visual angle characteristics have been described relative to the right/left direction, the characteristics may be described relative to the up/down direction and the like when necessary.

Figure 8A:
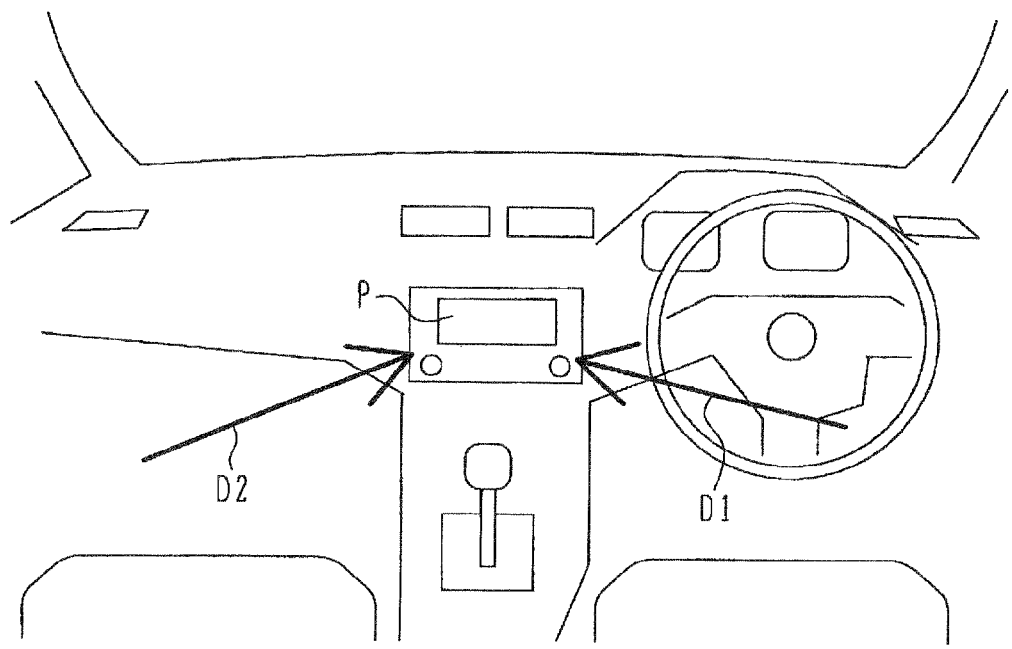
FIG. 8(A) is a schematic diagram showing an example of a display panel of a vehicle-mounted apparatus such as a car audio set.

FIG. 8(A) is a schematic diagram showing an example of a display panel of a vehicle mount apparatus such as a car audio set. This display panel P is mounted between a driver seat and a passenger seat so that the display panel is viewed at a deep visual angle from both the seats. In FIG. 8(A), a line of sight when the display panel P is viewed from the driver seat is indicated by an arrow symbol D1 and that when the display panel P is viewed from the passenger seat is indicated by an arrow symbol D2.

Figure 8B:
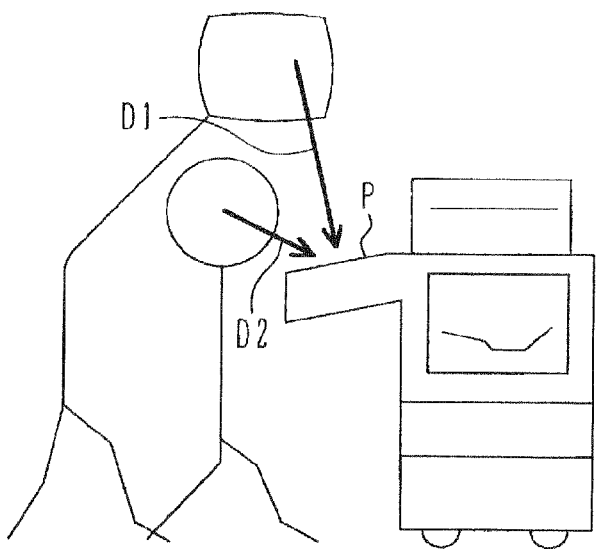
FIG. 8(B) is a schematic diagram showing an example of a display panel of an office apparatus such as a copy machine and a facsimile machine.

FIG. 8(B) is a schematic diagram showing an example of a display panel of an office apparatus such as a copy machine and a facsimile machine. The office apparatus of this type is operated on one hand by a tall person and on the other hand by a short person. A visual angle viewing the display panel may change greatly with a height of a person. In FIG. 8(B), a line of sight viewed by a tall person is indicated by an arrow symbol D1, and that by a short person is indicated by an arrow symbol D2.

Next, description will be made on a liquid crystal display device having another structure capable of good visual angle compensation even at a large retardation of a liquid crystal cell in a cross section in a thickness direction.

Figure 11:
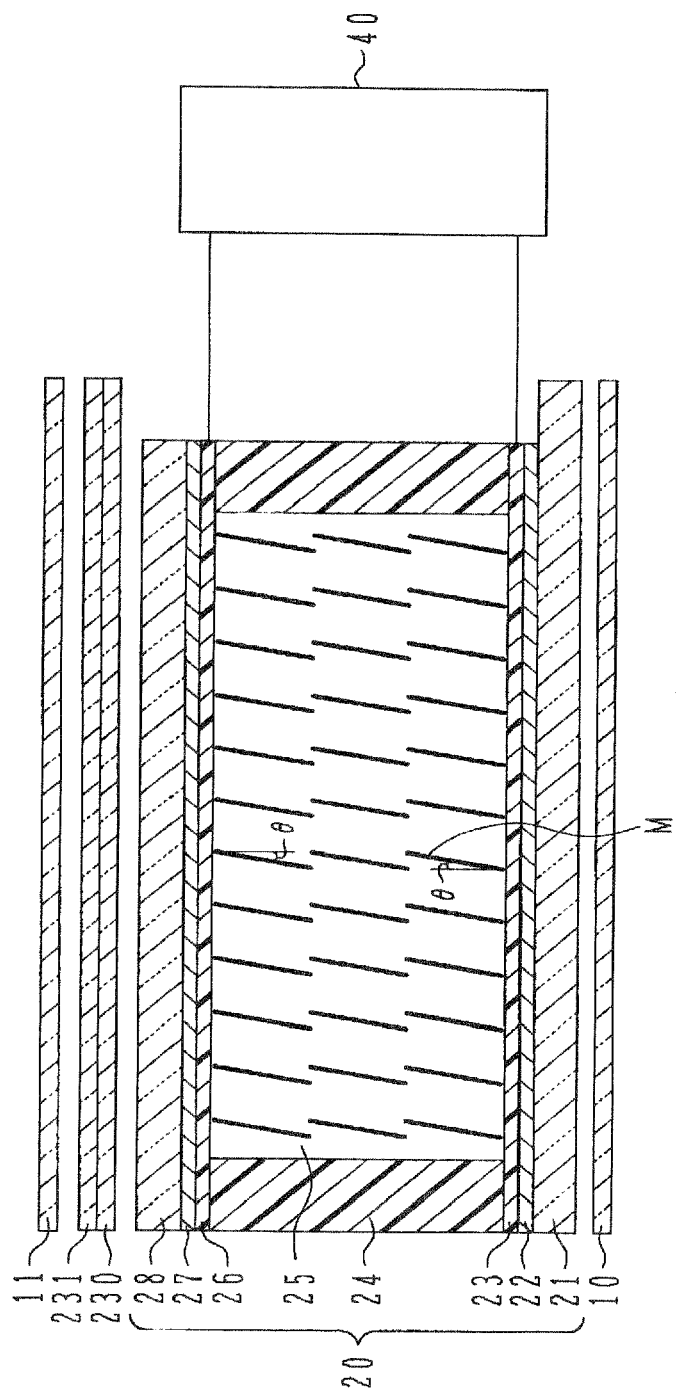
FIG. 11 is a schematic cross sectional view of a liquid crystal display device according to a third embodiment of the present invention.

With reference to FIG. 11, a liquid crystal display device of the third embodiment will be described. In the first embodiment described with reference to FIG. 1, the visual angle compensation member constituted of a stack of the C plate 30 and biaxial plate 31 is inserted between the liquid crystal cell 20 and front polarizing plate 11.

The third embodiment is different from the first embodiment in that a visual angle compensation member constituted of two biaxial plates 230 and 231 is inserted between the liquid crystal cell 20 and the front polarizing plate 11. A retardation of the liquid crystal cell 20 is different from that of the first embodiment. The other structures are similar to those of the first embodiment. The liquid crystal display device of the third embodiment also performs segment display by simple matrix driving.

The liquid crystal layer 25 is made of liquid crystal material having negative dielectric constant anisotropy (liquid crystal molecules fall from a vertical direction upon voltage application) and a birefringence Δn of 0.15, manufactured by, for example, Merck Ltd, Since the cell thickness is 4 μm and the birefringence Δn is 0.15, a retardation of the liquid crystal cell 20 in a cross section in a thickness direction is 600 nm. The liquid crystal cell 20 has a positive retardation in a cross section in a thickness direction.

Each of the biaxial plates 230 and 231 satisfies a relation of $n_x > n_y > n_z$ of three primary refractive indices, one refractive index $n_z$ in a surface normal direction (direction parallel to the surface normal direction of the display plane of the liquid crystal cell 20) and two indices $n_x$ and $n_y$ in an in-plane (in-plane parallel to the display plane of the liquid crystal cell 20).

Each of the biaxial plates 230 and 231 has a negative retardation having a magnitude of 205 nm in a cross section in a thickness direction. A magnitude of the retardation of the biaxial plate is calculated by multiplying a thickness of the biaxial plate by a difference between an average value $(n_x + n_y)/2$ of two in-plane indices $n_x$ and $n_y$ and a surface normal direction refractive index $n_z$.

An in-plane retardation of each of the biaxial plates 230 and 231 is 60 nm. The magnitude of the in-plane retardation of the biaxial plate is calculated by multiplying a thickness of the biaxial plate by a difference between one in-plane refractive index $n_x$ and the other in-plane refractive index $n_y$.

A member constituted of the biaxial plates 230 and 231, back polarizing plate 10 and front polarizing plate 11 has a negative retardation having a magnitude of 530 nm (205 nm+205 nm+60 nm+60 nm) in a cross section in a thickness direction.

The retardation of the liquid crystal cell in a cross section in a thickness direction can be compensated by setting the retardation of the member constituted of the biaxial plates 230 and 231 back polarizing plate 10 and front polarizing plate 11 in a cross section in a thickness direction to have the opposite positive or negative sign to that, and generally the same absolute value as that, of those of the retardation of the liquid crystal cell in a cross section in a thickness direction.

Figure 12:
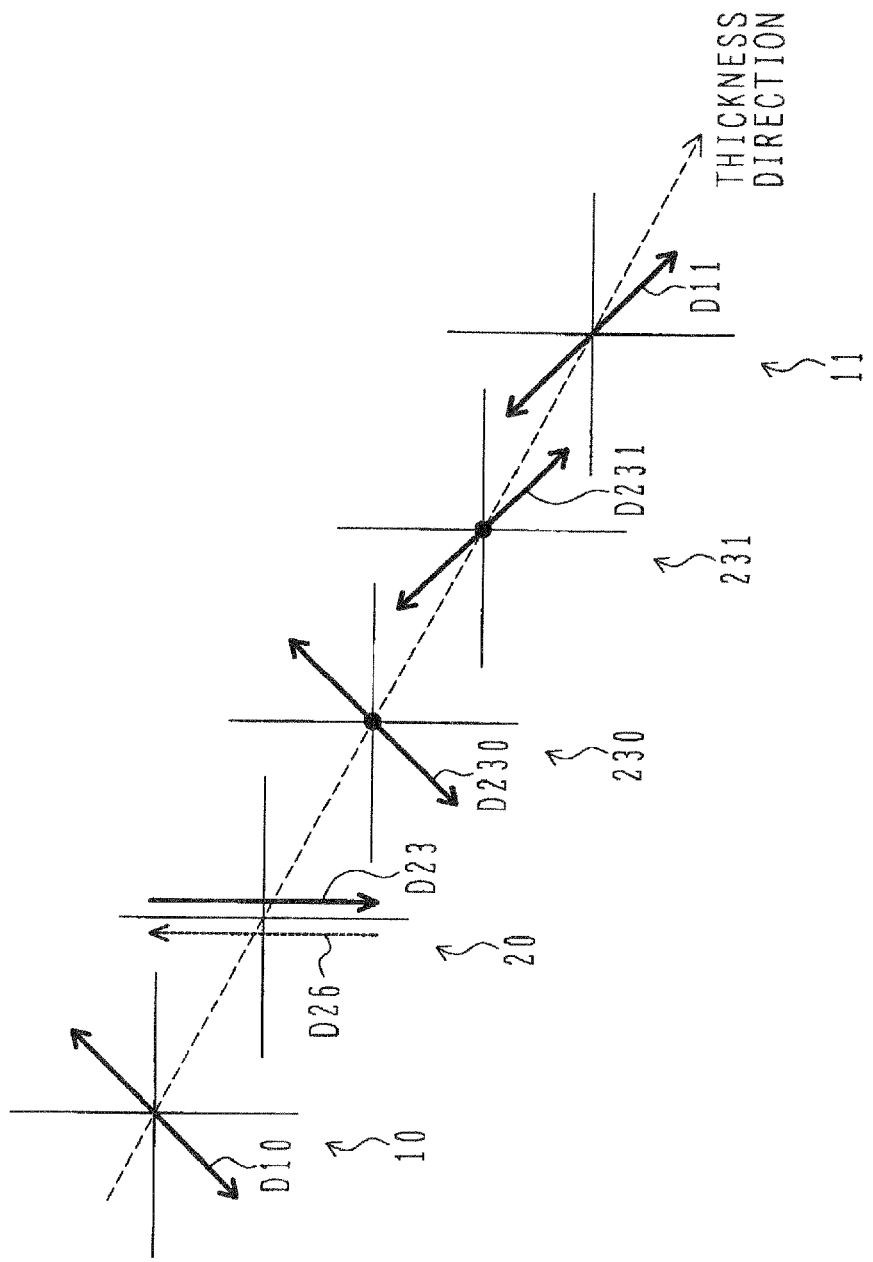
FIG. 12 is a schematic diagram of the liquid crystal display device of the third embodiment, drawn by rearranging schematic plan views of constituent members such as a back polarizing plate in the order of positions in a thickness direction.

Next, with reference to FIG. 12, description will be made on an absorption axis direction of the back polarizing plate 10, rubbing directions of the lower and upper alignment films of the liquid crystal cell 20, delay phase axis directions of the biaxial plates 230 and 231, and an absorption axis direction of the polarizing plate 11. FIG. 12 is a schematic view of the liquid crystal display device of the third embodiment, drawn by rearranging the schematic plan views of constituent members such as the back polarizing plate 10 in the order of positions in a thickness direction.

Absorption axes D10 and D11 of the back polarizing plate 10 and front polarizing plate 11 are generally perpendicular to each other in the display plane. Namely, the back polarizing plate 10 and front polarizing plate 11 are generally crossed-Nicol disposed.

A rubbing direction D23 of the lower alignment film 23 of the liquid crystal cell 20 and a rubbing direction D26 of the upper alignment film 26 are mutually antiparallel. The rubbing directions D23 and D26 have approximately an angle of 45° in the display plane relative to both the absorption axis directions D10 and D11 of the polarizing plates 10 and 11. Namely, the direction of liquid crystal molecules falling when a drive voltage is applied has approximately an angle of 45° relative to the absorption axes of both the polarizing plates.

An in-plane delay phase axis direction (direction corresponding to the in-phase maximum refractive index $n_x$) D231 of the biaxial plate 231 on the front polarizing plate 11 side is generally parallel in the display plane to the absorption axis direction D11 of the front polarizing plate 11. If an angle between two directions is in a range from −10° to 10°, it is called "generally parallel".

An in-plane delay phase axis direction D230 of the biaxial plate 230 on the liquid crystal cell 20 side is generally perpendicular in the display plane to the in-plane delay phase axis direction D231 of the biaxial plate 231.

As described earlier, a biaxial plate and a C plate are formed by drawing a film made of organic resin. The biaxial plate and C plate of this type are commercially available for application to visual angle compensation and the like, for example, of an active matrix liquid crystal display device having a vertically aligned liquid crystal cell (vertically aligned TFT-LCD).

A retardation of each of commercially available biaxial and C plates in a cross section in a thickness direction is about 90 to 250 nm. A biaxial plate having an in-plane retardation of 40 nm to 120 nm, particularly 40 nm to 70 nm is widely used.

Although it is considered that the in-plane retardation of the biaxial plate can be made smaller than 40 nm, a biaxial plate having such an in-plane retardation is not commercially available because it is difficult to control the in-plane retardation to be stably smaller than 40 nm and other reasons.

Many visual angle compensation plates, particularly biaxial plates, are widely circulated for application to a vertically aligned TFT-LCD (e.g., liquid crystal television set). Using widely circulated visual angle compensation plates or visual angle compensation plates of the same kind is desired from the viewpoint of, e.g., cost. The device of the third embodiment can be manufactured using two biaxial plates of the same kind (the retardation in a cross section in a thickness direction and an in-plane retardation are therefore equal).

Next, description will be made on liquid crystal display devices of fifth and sixth comparative examples. The fifth and sixth comparative examples are similar to the third embodiment in that two biaxial plates are disposed between the liquid crystal cell and front polarizing plate, but the in-plane delay phase axis direction of the biaxial plate is different from that of the third embodiment. Magnitudes of retardations (in a cross section in a thickness direction and in-plane) of the biaxial plates are similar to those of the third embodiment.

Figure 19:
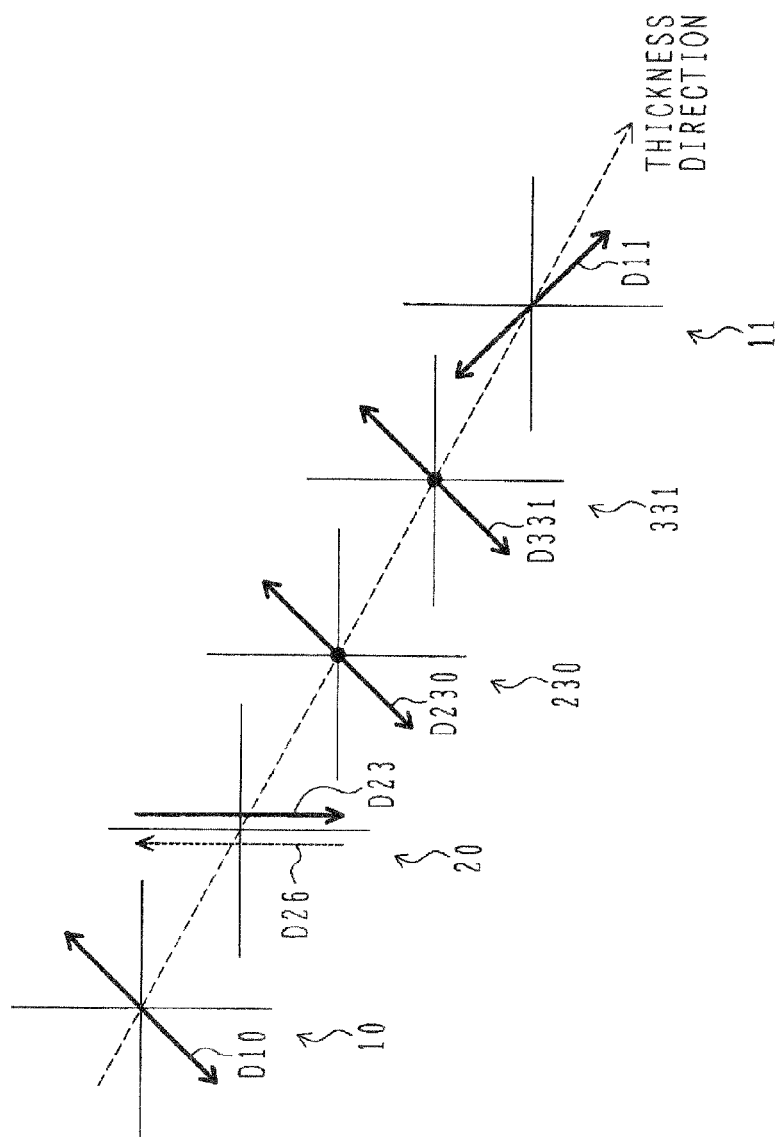
FIG. 19 is a schematic diagram of the liquid crystal display device of the fifth comparative example, drawn by rearranging schematic plan views of constituent members such as a back polarizing plate in the order of positions in a thickness direction.

FIGS. 19 and 20 are schematic diagrams of the liquid crystal display devices of the fifth and sixth comparative examples, respectively, drawn by rearranging schematic plan views of constituent members such as the back polarizing plate 10 in the order of positions in a thickness direction.

First, the fifth comparative example will be described with reference to FIG. 19. In the device of the fifth comparative example, the in-plane delay phase axis direction of the biaxial plate on the front polarizing plate 11 side is different from that of the third embodiment. A biaxial plate 331 on the front polarizing plate 11 side is disposed in such a manner that an in-plane delay phase axis direction D331 is perpendicular in the display plane to the absorption axis direction D11 of the front polarizing plate 11. An in-plane delay phase axis direction D230 of a biaxial plate 230 on the liquid crystal cell 20 side and the in-plane delay phase axis direction D331 of the biaxial plate 331 on the front polarizing plate 11 side are mutually parallel to each other in the display plane.

Next, the sixth comparative example will be described with reference to FIG. 20. In the device of the sixth comparative example, the in-plane delay phase axis direction of a biaxial plate on the front polarizing plate 11 side and the in-plane delay phase axis direction of a biaxial plate on the liquid crystal 20 side are different from those of the third embodiment. Similar to the fifth comparative example, the biaxial plate 331 on the front polarizing plate 11 side is disposed in such a manner that the in-plane delay phase axis direction D331 is perpendicular in the display plane to the absorption axis direction D11 of the front polarizing plate 11. The biaxial plate 330 on the liquid crystal cell 20 side is disposed in such a manner that an in-plane delay phase direction D330 is perpendicular in the display plane to the in-plane delay phase axis direction D331 of the biaxial plate 331.

Next, with reference to FIG. 21, description will be made on a liquid crystal display device of a seventh comparative example. FIG. 21 is a schematic diagram of the liquid crystal display devices of the seventh comparative example, drawn by rearranging schematic plan views of constituent members such as the back polarizing plate 10 in the order of positions in a thickness direction. The seventh comparative example is different from the third embodiment in that a biaxial plate is disposed on both sides of the liquid crystal cell 20. Magnitudes of retardations (in a cross section in a thickness direction and in-plane) of the biaxial plates are similar to those of the third embodiment.

An in-plane delay phase axis direction D330a of a biaxial plate 330a disposed between the back polarizing plate 10 and liquid crystal cell 20 is perpendicular in the display plane to the absorption axis direction D10 of the back polarizing plate 10. An in-plane delay phase axis direction D331 of a biaxial plate 331 disposed between the liquid crystal cell 20 and front polarizing plate 11 is perpendicular in the display plane to the absorption axis direction D11 of the front polarizing plate 11.

In the third embodiment, the in-plane delay phase axis of the biaxial plate adjacent to the front polarizing plate is parallel in the display plane to the absorption axis of the front polarizing plate. In all the fifth to seventh comparative examples, the in-plane delay phase axis of the biaxial plate adjacent to the front polarizing plate is perpendicular in the display plane to the absorption axis of the front polarizing plate.

Figure 13:
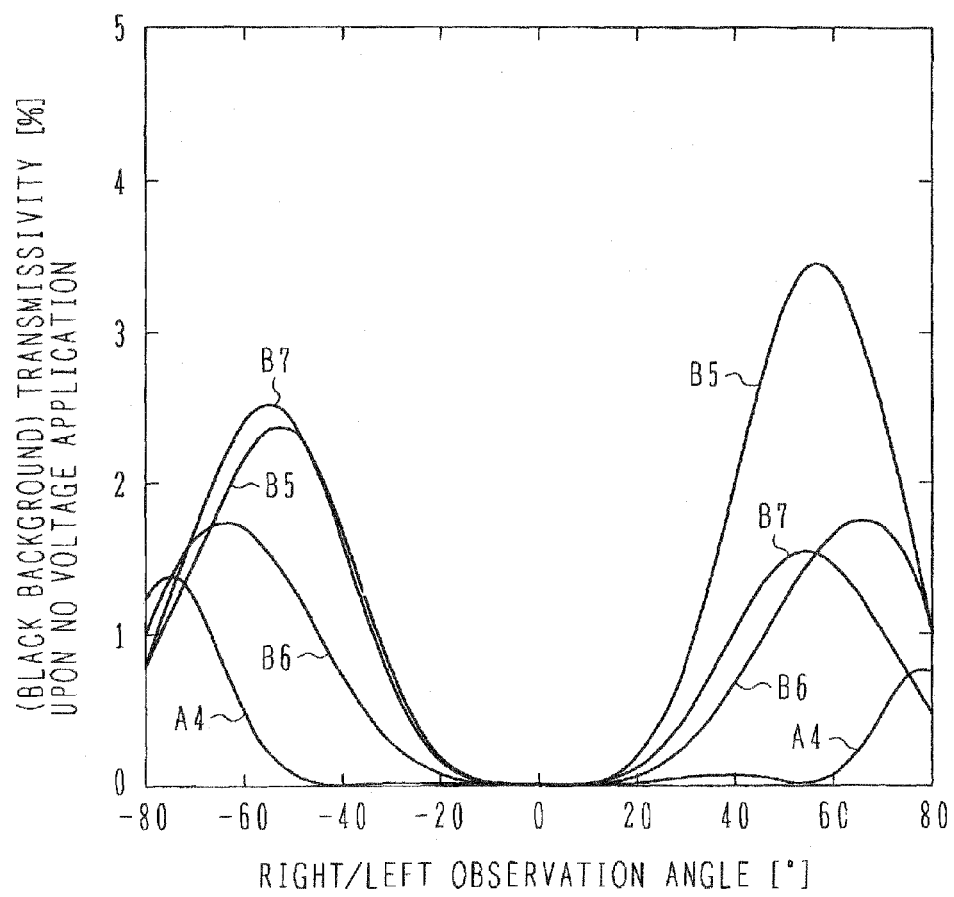
FIG. 13 is a graph showing the visual angle characteristics of a black background transmissivity upon no voltage application of liquid crystal display devices of the third embodiment and fifth to seventh comparative examples.

Next, with reference to FIG. 13, description will be made on the visual angle characteristics of the liquid crystal display devices of the third embodiment and fifth to seventh comparative examples. FIG. 13 is a graph showing a black background transmissivity upon application of no voltage. The abscissa represents a right/left observation angle in the unit of degree, and the ordinate represents a transmissivity in the unit of %. Curves A4, B5 to B7 indicate the visual angle characteristics of the third embodiment and fifth to seventh comparative examples, respectively.

All the third embodiment and fifth to seventh comparative examples have a tendency that a transmissivity increases at a deeper visual angle both right and left. However, a degree of increase is smallest for the embodiment. Also in this embodiment, a visual angle at which the transmissivity clearly starts rising is as large as about 50° both right and left. The device of the embodiment provides good black display at a deep visual angle. A difference between the embodiment and comparative examples becomes conspicuous in a visual angle range of about 20° or larger both right and left.

As described above, good visual angle characteristics can be obtained by disposing two biaxial plates between the liquid crystal cell and one polarizing plate in such a manner that the in-plane delay axis of the biaxial plate on the polarizing plate side is parallel in the display plane to the absorption axis of the adjacent polarizing plate and that the in-plane delay axis of the biaxial plate on the liquid crystal cell side is perpendicular in the display plane to the in-plane delay phase axis of the biaxial plate on the polarizing plate side.

Figure 14:
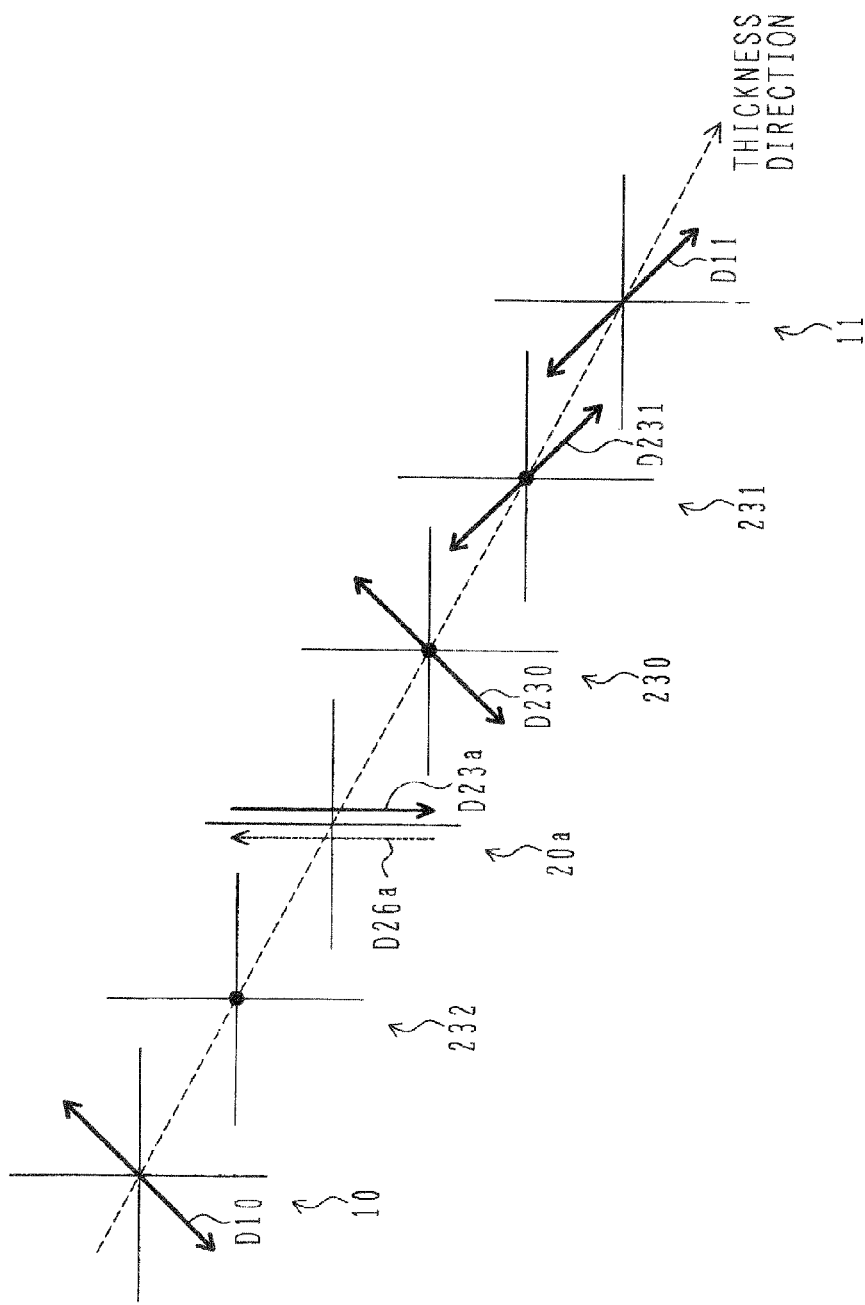
FIG. 14 is a schematic diagram of a liquid crystal display device of a fourth embodiment, drawn by rearranging schematic plan views of constituent members such as a back polarizing plate in the order of positions in a thickness direction.

With reference to FIG. 14, a liquid crystal display device of the fourth embodiment will now be described. In the fourth embodiment, a retardation of the liquid crystal cell in a cross section in a thickness direction is larger than that of the third embodiment, and correspondingly one C plate is used in addition to two biaxial plates. The structures other than the retardation of the liquid crystal cell in a cross section in a thickness direction and the added C plate, are similar to those of the third embodiment.

FIG. 14 is a schematic diagram of the liquid crystal display devices of the fourth embodiment, drawn by rearranging schematic plan views of constituent members such as the back polarizing plate 10 in the order of positions in a thickness direction. In the fourth embodiment, a cell thickness is 5.5 µm, a birefringence Δn of liquid crystal material is 0.15, and a retardation of a liquid crystal cell 20a in a cross section in a thickness direction is 825 nm. The liquid crystal material may be material manufactured by, for example, Merck Ltd.

Rubbing directions D23a and D26a for the lower alignment film and upper alignment film of the liquid crystal cell 20a are antiparallel to each other, and have an angle of about 45° relative to both the absorption axis directions D10 and D11 of the polarizing plates 10 and 11 crossed-Nicol disposed.

Similar to the third embodiment, two biaxial plates 230 and 231 are disposed between the liquid crystal cell 20a and front polarizing plate 11. A C plate 232 is disposed between the back polarizing plate 10 and liquid crystal cell 20a. The C plate has a negative retardation having a magnitude of 220 nm in a cross section in a thickness direction.

A member constituted of the two biaxial plates 230 and 231, C plate 232, back polarizing plate 10 and front polarizing plate 11 has a negative retardation having a magnitude of 750 nm (205 nm+205 nm+220 nm+60 nm+60 nm) in a cross section in a thickness direction.

The retardation of the liquid crystal cell of the fourth embodiment is larger than that of the third embodiment. In order to compensate for this retardation, the two biaxial plates are inserted between the liquid crystal cell and one polarizer plate similar to the third embodiment, and in addition the C plate is disposed between the liquid crystal cell and other polarizer plate to increase the retardation of the visual angle compensation member. The C plate may be disposed between the liquid crystal cell and the biaxial plate on the liquid crystal side, when necessary.

Figure 15:
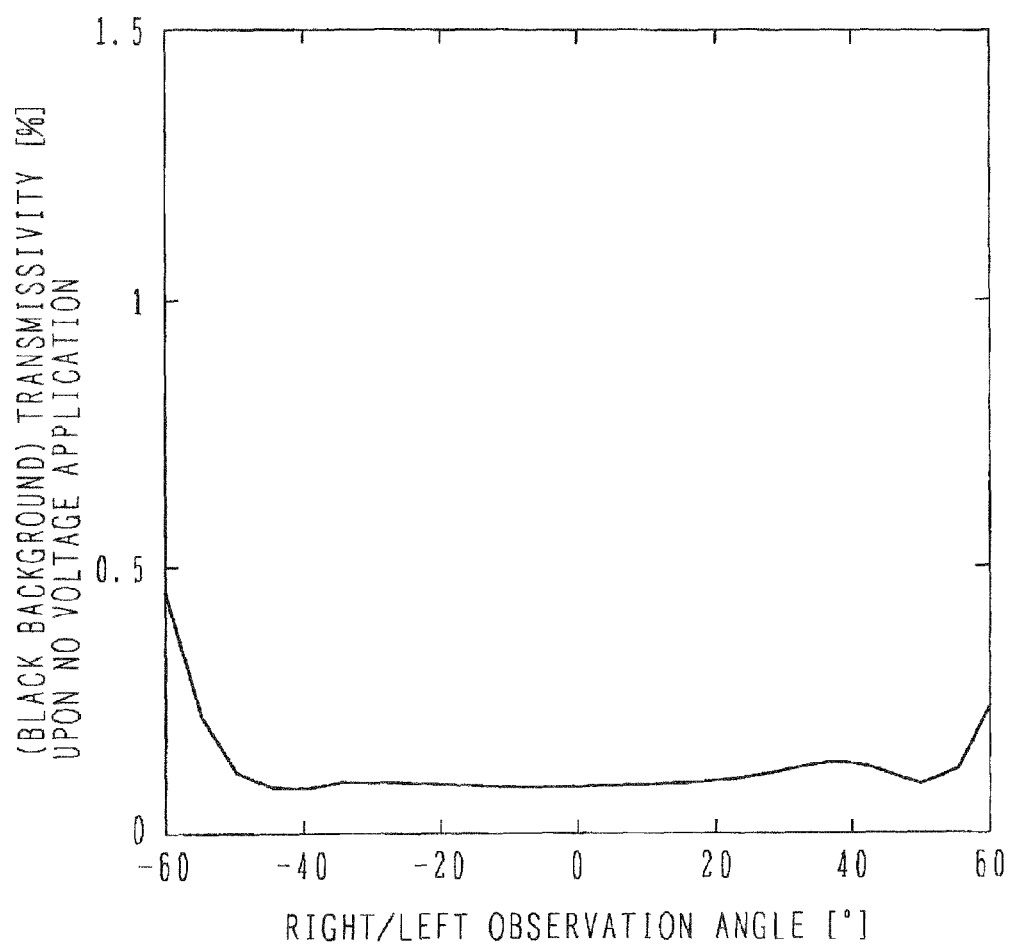
FIG. 15 is a graph showing the visual angle characteristics of a black background transmissivity upon no voltage application of the liquid crystal display device of the fourth embodiment.

Next, with reference to FIG. 15, description will be made on the visual angle characteristics of the liquid crystal display device of the fourth embodiment. FIG. 15 is a graph showing a black background transmissivity upon application of no voltage. The abscissa represents a right/left observation angle in the unit of degree, and the ordinate represents a transmissivity in the unit of %. Similar to the third embodiment, also in the fourth embodiment, a visual angle at which the transmissivity clearly starts rising is as large as about 50° both right and left, suppressing a rise in the transmissivity at a deep visual angle.

Next, with reference to FIG. 16, a liquid crystal display device of the fifth embodiment will be described. In the fifth embodiment, a retardation of the liquid crystal cell in a cross section in a thickness direction is larger than that of the fourth embodiment, and correspondingly two C plates are used in addition to two biaxial plates. The structures other than the retardation of the liquid crystal cell in a cross section in a thickness direction and the added C plates, are similar to those of the third embodiment.

Figure 16:
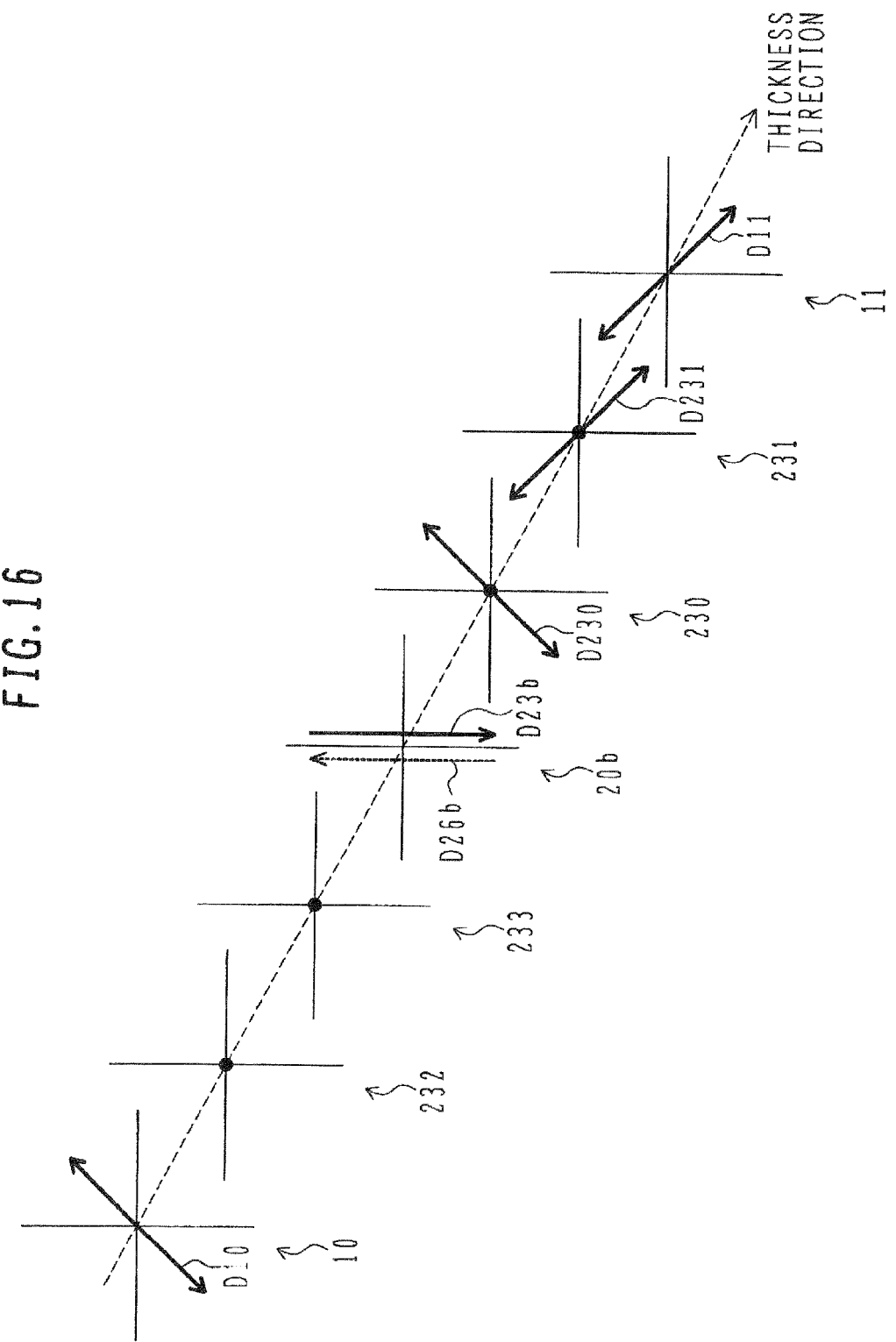
FIG. 16 is a schematic diagram of a liquid crystal display device of a fifth embodiment, drawn by rearranging schematic plan views of constituent members such as a back polarizing plate in the order of positions in a thickness direction.

FIG. 16 is a schematic diagram of the liquid crystal display devices of the fifth embodiment, drawn by rearranging schematic plan views of constituent members such as the back polarizing plate 10 in the order of positions in a thickness direction. In the fifth embodiment, a cell thickness is 6.9 µm, a birefringence Δn of liquid crystal material is 0.15, and a retardation of a liquid crystal cell 20b in a cross section in a thickness direction is 1035 nm. The liquid crystal material may be material manufactured by, for example, Merck Ltd.

Rubbing directions D23b and D26b for the lower alignment film and upper alignment film of the liquid crystal cell 20b are antiparallel to each other, and have an angle of about 45° relative to both the absorption axis directions D10 and D11 of the polarizing plates 10 and 11 crossed-Nicol disposed.

Similar to the third and fourth embodiment, two biaxial plates 230 and 231 are disposed between the liquid crystal cell 20b and front polarizing plate 11. Similar to the fourth embodiment, a C plate 232 is disposed between the back polarizing plate 10 and liquid crystal cell 20b. Further, a C plate 233 is disposed between the C plate 232 and liquid crystal cell 20b. The C plate 233 has a negative retardation having a magnitude of 220 nm in a cross section in a thickness direction.

A member constituted of the two biaxial plates 230 and 231, two C plates 232 and 233, back polarizing plate 10 and front polarizing plate 11 has a negative retardation having a magnitude of 970 nm (205 nm+205 nm+220 nm+220 nm+60 nm+60 nm) in a cross section in a thickness direction.

The retardation of the liquid crystal cell of the fifth embodiment is larger than that of the fourth embodiment. In order to compensate this retardation, a plurality of C plates are laminated to increase the retardation of the visual angle compensation member. An additional C plate may be disposed between the liquid crystal cell and the biaxial plate on the liquid crystal side, when necessary (C plates may be disposed on both sides of the liquid crystal cell). Alternatively, a lamination of a plurality of C plates may be disposed between the liquid crystal cell and the biaxial plate on the liquid crystal cell side.

Figure 17:
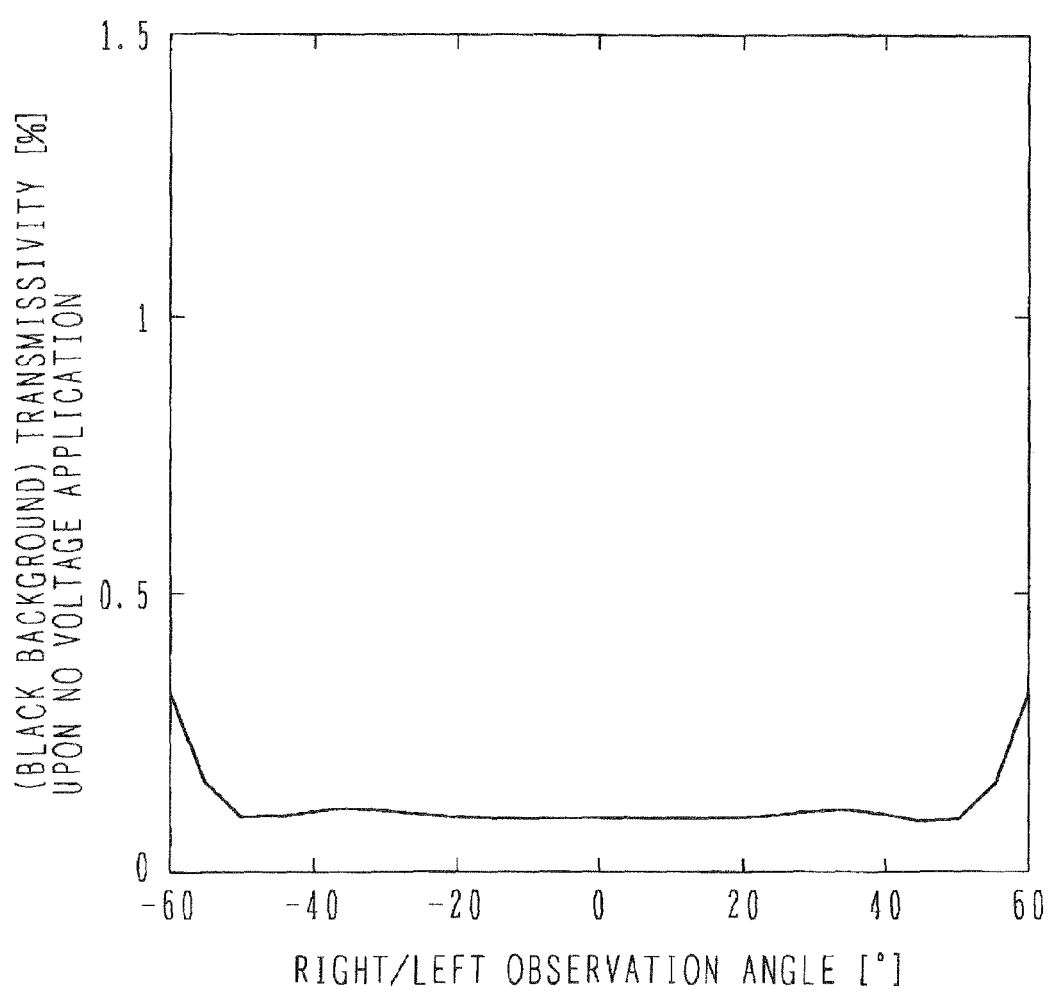
FIG. 17 is a graph showing the visual angle characteristics of a black background transmissivity upon no voltage application of the liquid crystal display device of the fifth embodiment.

Next, with reference to FIG. 17, description will be made on the visual angle characteristics of the liquid crystal display device of the fifth embodiment. FIG. 17 is a graph showing a black background transmissivity upon application of no voltage. The abscissa represents a right/left observation angle in the unit of degree, and the ordinate represents a transmissivity in the unit of %. Similar to the third and fourth embodiments, also in the fifth embodiment, a visual angle at which the transmissivity clearly starts rising is as large as about 50° both right and left, suppressing a rise in the transmissivity at a deep visual angle.

Figure 18:
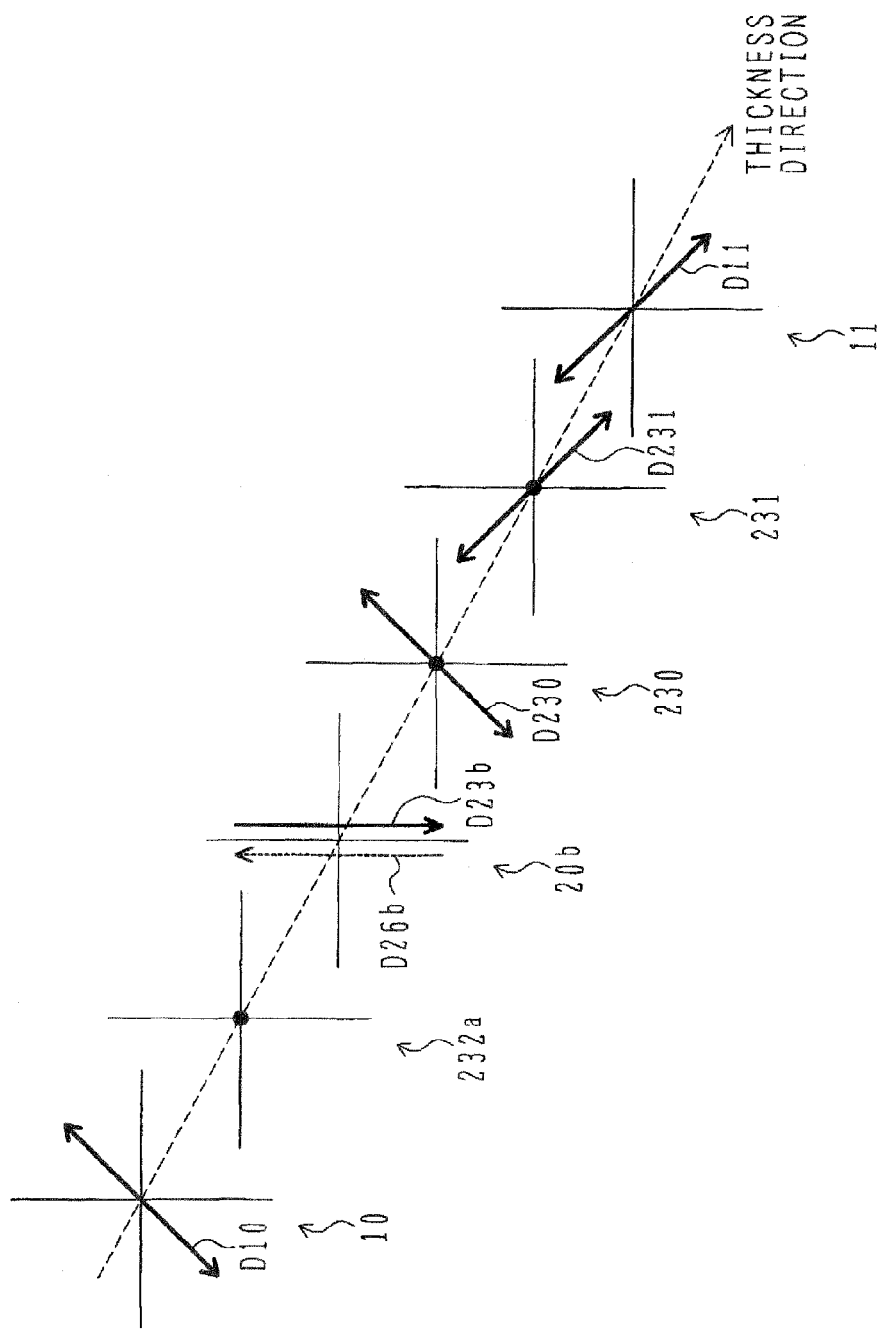
FIG. 18 is a schematic diagram of a liquid crystal display device of a modification of the fifth embodiment, drawn by rearranging schematic plan views of constituent members such as a back polarizing plate in the order of positions in a thickness direction.

Next, with reference to FIG. 18, description will be made on a liquid crystal display device according to a modification of the fifth embodiment. FIG. 18 is a schematic diagram of the liquid crystal display device of the modification, drawn by rearranging schematic plan views of constituent members such as the back polarizing plate 10 in the order of positions in a thickness direction.

This modification has a structure that in place of a lamination of two C plates of the fifth embodiment, one optical plate 232a is disposed which has the same retardation (440 nm) in a cross section in a thickness direction as that of the two C plates. The other structures are similar to those of the fifth embodiment.

The optical plate 232a is made of cholesteric liquid crystal polymer having a twist pitch shorter than a visual wavelength, such as described in the modification of the second embodiment. This optical plate may be disposed between the liquid crystal cell and the biaxial plate on the liquid crystal cell side.

The visual angle characteristics of the black background transmissivity upon application of no voltage are approximately coincident with those of the fifth embodiment (refer to FIG. 17).

As described above, if a retardation of a vertically aligned liquid crystal cell in a cross section in a thickness direction is large, the two biaxial plates are disposed between the liquid crystal cell and one polarizing plate in such a manner that the in-plane delay phase axis of the biaxial plate disposed on the polarizing plate side is generally parallel to the absorption axis of the polarizing plate and that the in-plane delay phase axis of the biaxial plate disposed on the liquid crystal cell side is generally perpendicular to the in-plane delay phase axis of the biaxial plate disposed on the polarizing plate side. In this way, it becomes possible to obtain a liquid crystal display device having good visual angle characteristics.

If the retardation of a liquid crystal cell in a cross section in a thickness direction cannot be compensated sufficiently even if two biaxial plates are used, it is effective to add a C plate to increase the retardation of the visual angle compensation member in a cross section in a thickness direction. The C plate may be disposed on either side of the liquid crystal cell, or a plurality of C plates may be laminated. If the C plate is disposed on the same side as that of the biaxial plate, the C plate is disposed on the side nearer to the liquid crystal cell than the biaxial plate. As the C plate, not only a C plate formed by a drawing process of organic resin, but also an optical plate made of cholesteric liquid crystal may be used.

In the above embodiments, a biaxial plate is used which has a retardation of 205 nm in a cross section in a thickness direction and an in-plane retardation of 60 nm. In order to study a preferable range of the in-plane retardation of a biaxial plate, devices having a similar structure to that of the third embodiment were formed by changing the in-plane retardation of each biaxial plate. The in-plane retardations were set to 40 nm, 60 nm, 80 nm, 100 nm, 120 nm and 140 nm.

Displays of these devices were visually observed. The devices having the in-plane retardations of 40 nm and 60 nm were excellent in the visual angle characteristics including a tone change, and the devices having the in-plane retardations of 120 nm and 140 nm were poor in quality because a tone change and a rise in a transmissivity were observed in a deep visual angle range. Although the devices having the in-plane retardations of 80 nm and 100 nm have quality inferior to that of the devices having the in-plane retardations of 40 nm to 60 nm, this quality was within an allowable range. It has been found from these that the in-plane retardation of the biaxial plate is preferably 100 nm or smaller and more preferably 60 nm or smaller.

The liquid crystal display device of the third to fifth embodiments can also present good display in a wide visual angle range from a shallow visual angle to a deep visual angle. The liquid display device of this type is suitable for, for example, a display panel of a vehicle mount apparatus such as a car audio set, a display panel of a business machine such as a copy machine and a facsimile machine, and the like. In the above-described embodiments, although the good visual angle characteristics have been described relative to the right/left direction, the characteristics may be described relative to the up/down direction and the like when necessary.

The liquid crystal display device may be used not only in a state that the biaxial plate is disposed on the liquid crystal cell on the side nearer to an observer, but also in a state that the biaxial plate is disposed on the liquid crystal cell on the side farther to an observer.

Next, description will be made on a liquid crystal display device capable of suppressing a display quality from being degraded by crosstalk even if a pretilt angle is made large to some extent.

With reference to FIGS. 22 and 23, description will be made on a liquid crystal display device according to the sixth embodiment of the present invention. FIG. 22 is a schematic cross sectional view of the liquid crystal display device of the embodiment. A liquid crystal cell 530 is disposed between a back polarizing plate 510 and a front polarizing plate 511. The back polarizing plate 510 and front polarizing plate 511 are crossed-Nicol disposed.

The structure of the liquid crystal cell 530 will be described. A lower transparent electrode 532 is formed on the upper surface of a lower transparent substrate 531, and a lower alignment film 533 is formed on the upper surface of the lower transparent electrode 532. An upper transparent electrode 537 is formed on the lower surface of an upper transparent substrate 538, and an upper alignment film 536 is formed on the lower surface of the upper transparent electrode 537. A liquid crystal layer 535 is sandwiched between the confronting lower alignment film 533 and upper alignment film 536, and a seal member 534 seals the liquid crystal layer 535. A gap control member has a diameter of, e.g., 4 μm.

The liquid crystal cell 530 performs segment display and is single-matrix driven. The lower and upper transparent electrodes 532 and 537 have a pattern corresponding to a display pattern of the liquid crystal cell 530, and are connected to a control device 540. The control device 540 controls a display state.

The lower and upper alignment films 533 and 536 are made of, for example, vertically aligned films SE-1211 manufactured by Nissan Chemical industries, Ltd. By rubbing the lower and upper alignment films 533 and 536 with a rubbing cloth made of, for example, rayon, a pretilt angle θ is given in such a manner that liquid crystal molecules M fall in a rubbing direction. The pretilt angle θ is, for example, 1.2°.

Figure 23A:
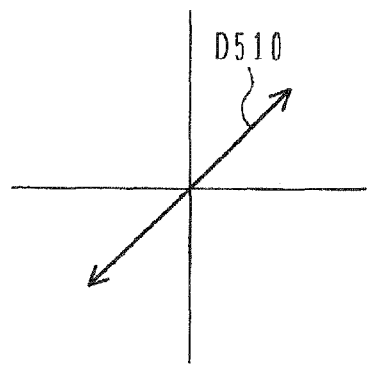
FIG. 23(A) is a plan view showing an absorption axis direction of a back polarizing plate.
Figure 23B:
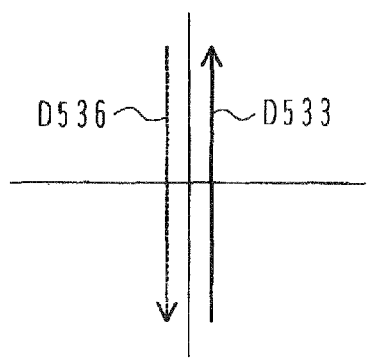
FIG. 23(B) is a plan view showing rubbing directions of lower and upper alignment films.
Figure 23C:
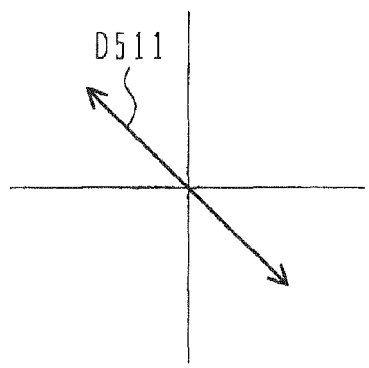
FIG. 23(C) is a plan view showing an absorption axis direction of a front polarizing plate.

With reference to FIGS. 23(A) to 23(C), description will be made on an absorption direction of the polarizing plate and rubbing directions of the alignment films. FIGS. 23(A) to 23(C) are plan views showing the absorption axis direction of the back polarizing plate 510, rubbing directions of the lower and upper alignment films 533 and 536, and the absorption axis of the front polarizing plate 511.

As shown in FIGS. 23(A) and 23(C), absorption axis directions D510 and D511 of the back polarizing plate 510 and front polarizing plate 511 are mutually perpendicular as viewed in plan (in the display plane). As shown in FIG. 23(B), a rubbing direction D533 for the lower alignment film 533 and a rubbing direction D536 for the upper alignment film 536 are mutually antiparallel. The rubbing directions D533 and D536 have both an angle of about 45° in the display plane relative to both the absorption axis directions D510 and D511 of the polarizing plates 510 and 511.

Description continues reverting to FIG. 22. The liquid crystal layer 535 is made of liquid crystal material having negative dielectric constant anisotropy (liquid crystal molecules fall from a vertical direction upon voltage application) and a birefringence Δn of 0.14, manufactured by, for example, Merck Ltd. Since a thickness of the liquid crystal layer 535 is 4 μm and the birefringence Δn is 0.14, a retardation of the liquid crystal layer 535 in a cross section in a thickness direction (this is simply called a retardation of the liquid crystal layer 535) is 560 nm.

A visual angle compensation plate 520 is inserted between the back polarizing plate 510 and a liquid crystal cell 530. For example, the visual angle compensation plate 520 is a stack of two C plates 521 and 522. The C plate has three primary refractive indices, two indices (in-plane two indices) having the same value, and the remaining refractive index having the smallest value and its corresponding axis being parallel to a normal direction of the compensation plate.

The optical axes of the C plates 521 and 522 are parallel to the surface normal direction. A retardation of each C plate in a cross section in a thickness direction has an absolute value of, e.g., 260 nm having a positive or negative sign opposite to that of the liquid crystal layer 535. A retardation of the visual angle compensation plate 520 in a cross section in a thickness direction is, e.g., 520 nm.

The back polarizing plate 510 and front polarizing plate 511 have the structure that a polarizer film is protected by a triacetylcellulose (TAC) film. Since the TAC film has a retardation, the back polarizing plate 510 and front polarizing plate 511 function also as C plates.

A general polarizing plate has a TAC film on both sides of a polarizer. In this embodiment, a study target is a retardation of only the TAC film disposed on the polarizer at a position nearer to the liquid crystal cell 530. A retardation of each polarizing plate in a cross section in a thickness direction (a retardation of the TAC film on the liquid crystal cell side in a cross section in a thickness direction) has an absolute value of, e.g., 60 nm and a positive or negative sign opposite to that of the liquid crystal layer 535.

A total value of retardations of the visual angle compensation plate 520, back polarizing plate 510 and front polarizing plate 511 in a cross section in a thickness direction, from the surface of a polarizer of the back polarizing plate 510 on the liquid crystal cell side to the surface of a polarizer of the front polarizing plate 511 on the liquid crystal side, has an absolute value of, e.g., 640 nm (520 nm+60 nm+60 nm) and a positive or negative sign opposite to that of the liquid crystal layer 535.

The total value of retardations of the visual angle compensation plate 520, back polarizing plate 510 and front polarizing plate 511 in a cross section in a thickness direction of the liquid crystal layer 535, is called a total retardation for compensation. The feature of the liquid crystal display device of this embodiment resides in that the total retardation for compensation has an opposite positive or negative sign and a larger absolute value relative to a retardation (e.g., 560 nm) of the liquid crystal layer 535.

That the total retardation for compensation has an opposite positive or negative sign and a larger absolute value relative to the retardation of the liquid crystal layer 535 is simply expressed as the total retardation for compensation is larger than the retardation of the liquid crystal layer.

If the absolute value of the total retardation for compensation is 101% or larger of the absolute value of the liquid crystal layer, this is defined that the absolute value of the total retardation for compensation is larger than the retardation of the liquid crystal layer. If the absolute value of the total retardation for compensation is 100% or larger and smaller than 101% of the absolute value of the liquid crystal layer, this is defined that both the retardations are approximately equal.

Figure 24A:
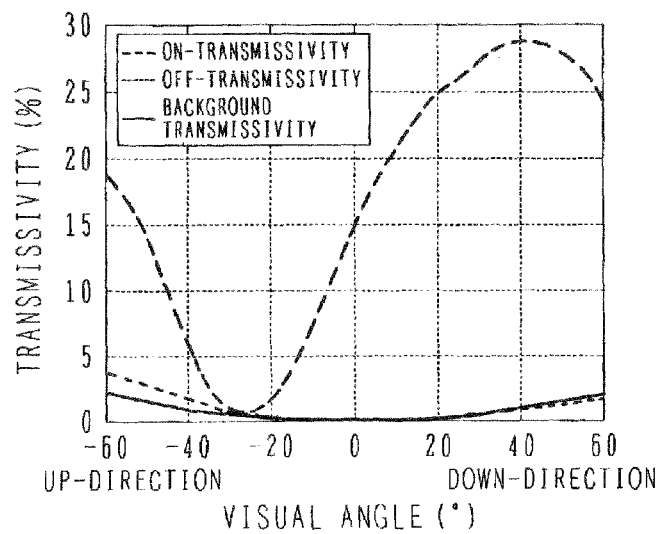
FIGS. 24(A) and 24(B) are graphs showing an on-transmissivity, an off-transmissivity and an background transmissivity of the liquid crystal display device of the sixth embodiment having a total compensation retardation of 640 nm.
Figure 24B:
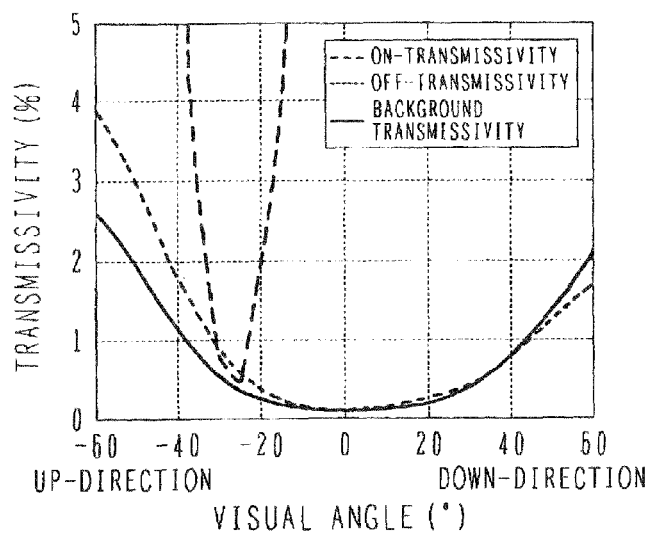

Next, with reference to FIGS. 24(A) and 24(B), description will be made on the experiments made to measure the visual angle characteristics of the liquid crystal display device of the sixth embodiment. The measurements were conducted for the liquid crystal display device whose liquid crystal layer has a retardation of 560 nm and whose total retardation for compensation is 640 nm. An on-transmissivity, an off-transmissivity and an background transmissivity (transmissivity at an application voltage of 0 V) were measured while the liquid crystal display device is simple-matrix driven at a 1/8 duty and a 1/4 duty. Graphs of the measurement results are shown in FIGS. 24(A) and 24(B).

Figure 28A:
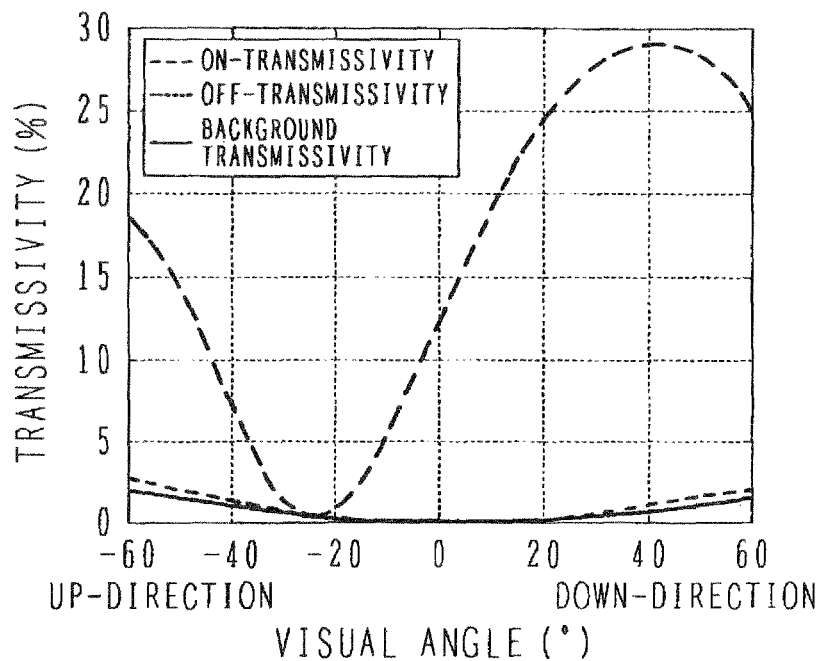
FIGS. 28(A) and 28(B) are graphs showing the visual angle characteristics of the liquid crystal display device of an eighth comparative example.
Figure 28B:
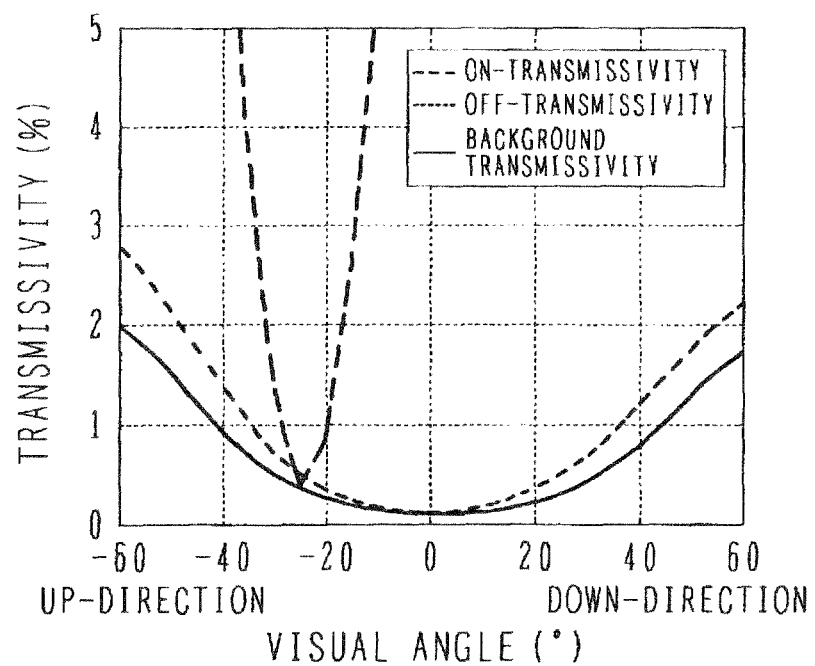

Similar measurements were conducted by manufacturing as an eighth comparative example a liquid crystal display device whose total retardation for compensation is 560 nm which is equal to that of the liquid crystal layer. This device was manufactured by replacing the visual angle compensation plate of the device of the sixth embodiment with a stack of two C plates each having a retardation of 220 nm. Graphs of the measurement results are shown in FIGS. 28(A) and 28(B).

In the display plane, a direction of liquid molecules falling upon voltage application is defined as an up-direction, and a direction opposite to this direction is defined as a down-direction. In the graphs shown in FIGS. 24(A), 24(B), 28(A) and 28(B), the abscissa represents a visual angle in the up- and down-directions, and the ordinate represents a transmissivity. A broken line indicates the on-transmissivity, a dotted line indicates the off-transmissivity, and a solid line indicates the background transmissivity. FIGS. 24(B) and 28(B) are enlarged views of FIGS. 24(A) and 28(A), respectively.

The down-direction is a so-called best visual recognition direction, and along this direction, the on-transmissivity is maintained at a high level even if the visual angle is slanted. In contrast, the up-direction is a direction along which there exists an angle range (display crushed angle range) where the on-transmissivity lowers to about the level of the off-transmissivity. Generally, a liquid crystal display device is often used to be viewed along the best visual recognition direction (down-direction), and is rarely used to be viewed along the opposite direction (up-direction).

Generally, if the off-transmissivity is larger than the background transmissivity, an off-segment is viewed as a slightly on-state so that the display quality is poor. Namely, crosstalk degrades the display quality. Conversely, if the off-transmissivity is smaller than the background transmissivity, an off-segment is darker than the background so that the off-segment will not become too conspicuous. Namely, the display quality is not degraded so much.

Consider now a difference between the off-transmissivity and background transmissivity along the best visual recognition direction (down-direction). In the eighth comparative example (FIG. 28(B)), since the off-transmissivity is large than the background transmissivity from a visual angle of 0° to a visual angle of 60°, it is feared that the display quality is degraded by crosstalk. As the visual angle becomes large, a difference between the off-transmissivity and background transmissivity expands and large crosstalk appears.

In the sixth embodiment (FIG. 24(B)), although the off-transmissivity is slightly larger than the background transmissivity from a visual angle of 0° to a visual angle of about 40°, a difference between the off-transmissivity and background transmissivity is very small so that crosstalk is suppressed. At a visual angle of about 40° and larger, the off-transmissivity becomes lower than the background transmissivity. As the visual angle becomes more larger, although a difference between the off-transmissivity and background transmissivity becomes slightly large, the display quality is not degraded so much because the off-transmissivity is smaller than the background transmissivity. By setting the total retardation for compensation larger than the retardation of the liquid crystal layer in the manner described above, crosstalk along the best visual recognition direction can be suppressed.

Along the opposite direction to the best visual recognition direction, the off-transmissivity is larger than the background transmissivity in both the eighth comparative example and sixth embodiment. A difference between the off-transmissivity and background transmissivity of the sixth embodiment is slightly larger than that of the eighth comparative example, and crosstalk is likely to occur. However, as described above, there exists the crushed display angle range along the opposite direction to the best visual recognition direction, and therefore the liquid crystal display device will be viewed rarely along this direction. Therefore, even if crosstalk becomes likely to occur along this direction, it is expected that there is no practical problem.

Next, with reference to FIGS. 25(A) and 25(B) and FIGS. 26(A) and 26(B), description will be made on the experiments made to check a particularly preferable increase amount of the total retardation for compensation relative to the retardation of the liquid crystal layer.

Figure 25A:
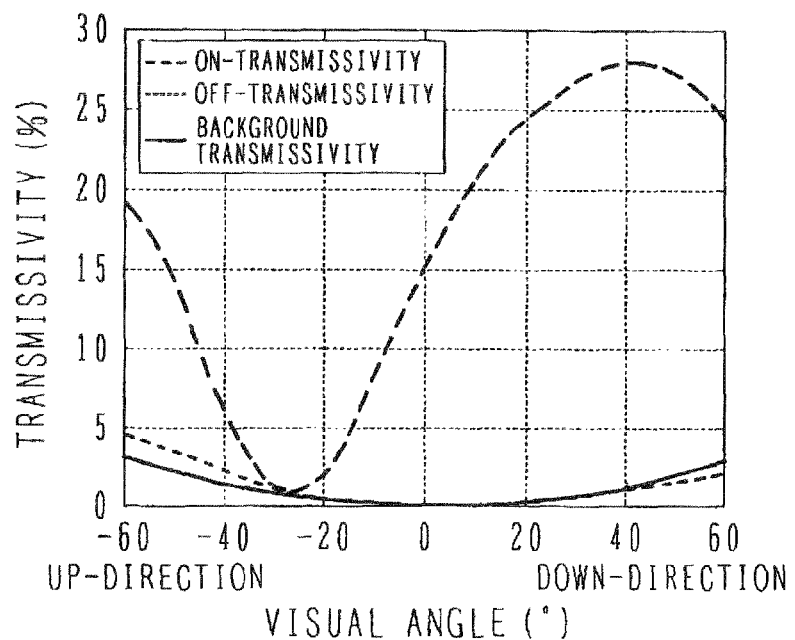
FIGS. 25(A) and 25(B) are graphs showing the visual angle characteristics of the liquid crystal display device of the sixth embodiment having a total compensation retardation of 690 nm.

Liquid display devices of the sixth embodiments were manufactured having the total retardations for compensation of 690 nm and 575 nm. A retardation of the liquid crystal layer was set to 560 nm. The visual angle characteristics of the former (690 nm) are shown in FIGS. 25(A) and 25(B), and the visual angle characteristics of the latter (575 nm) are shown in FIGS. 26(A) and 26(B).

Figure 25B:
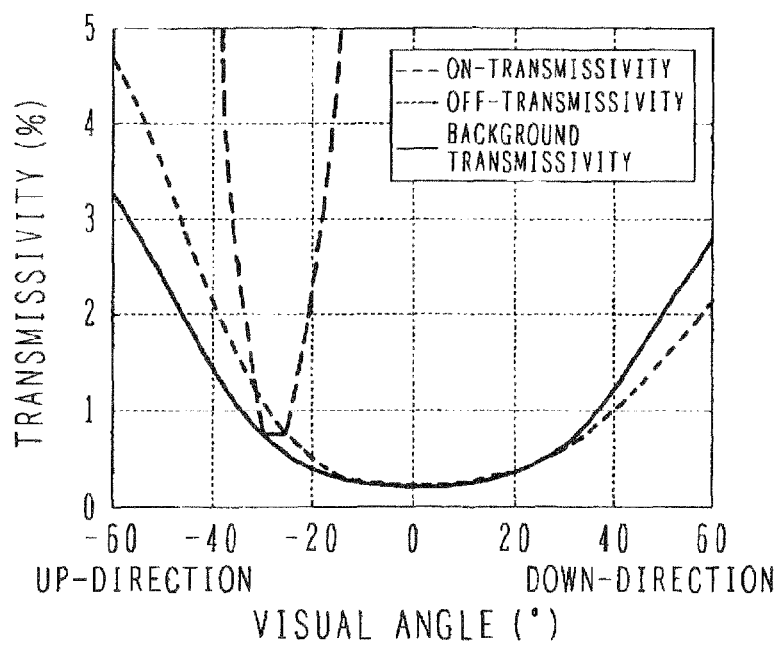
Figure 26A:
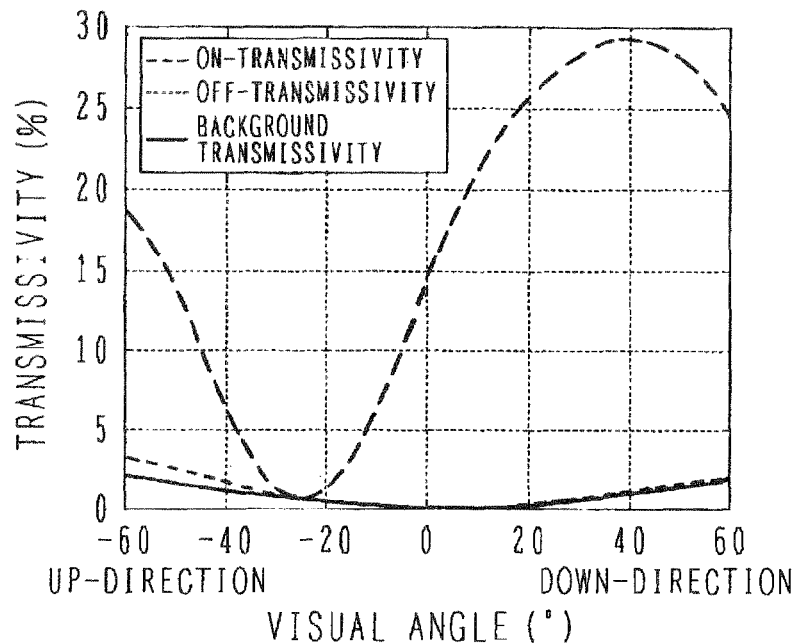
FIGS. 26(A) and 26(B) are graphs showing the visual angle characteristics of the liquid crystal display device of the sixth embodiment having a total compensation retardation of 575 nm.
Figure 26B:
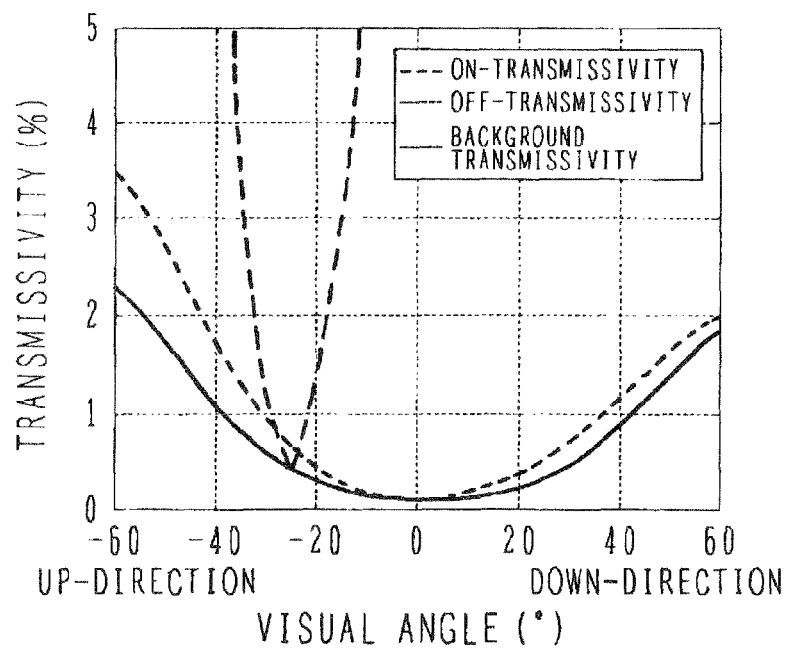

In the graphs shown in FIGS. 25(A), 25(B), 26(A) and 26(B), the abscissa represents a visual angle in the up- and down-directions, and the ordinate represents a transmissivity. A broken line indicates the on-transmissivity, a dotted line indicates the off-transmissivity, and a solid line indicates the background transmissivity. FIGS. 25(B) and 26(B) are enlarged views of FIGS. 25(A) and 26(A), respectively.

Consider a difference between the off-transmissivity and background transmissivity along the best visual recognition direction (down-direction). As shown in FIGS. 25(A) and 25(B), in the device having the total retardation for compensation of 690 nm, a difference between the off-transmissivity and background transmissivity is slightly large in a large visual angle range (e.g., a range of 40° or larger). However, since the off-transmissivity is smaller than the background transmissivity, degradation of the display quality is in an allowable range.

If the total retardation for compensation is set larger than 690 nm, as the background transmissivity rises, it is expected that a difference between the off-transmissivity and background transmissivity becomes too large. In a range of the total retardation for compensation larger than 690 nm, it is considered that degradation of the display quality becomes out of the allowable range even if the off-transmissivity is lower than the background transmissivity.

As shown in FIGS. 26(A) and 26(B), in the device having the total retardation for compensation of 575 nm, although the off-transmissivity is larger than the background transmissivity, a difference between the off-transmissivity and background transmissivity is suppressed lower than that of the eighth comparative example (the total retardation for compensation is equal to that of the liquid crystal layer) described with reference to FIGS. 28(A) and 28(B). Namely, crosstalk is suppressed.

It can be considered from these experiments that if the retardation of the liquid crystal layer is 560 nm, it is particularly preferable to set the total retardation for compensation in a range of a minimum of 575 nm and a maximum of 690 nm. For generalization allowing the liquid crystal layer to have a retardation of other values, it is considered particularly preferable to set the total retardation (absolute value) for compensation in a range of a minimum of 1.03 times (575 nm/560 nm) and a maximum of 1.23 times (690 nm/560 nm) the retardation of the liquid crystal layer.

Next, description will be made on the experiments made to check a preferable pretilt angle. At a very small pretilt angle (e.g., 0.4°), crosstalk hardly occurred. Occurrence of crosstalk did not change under any compensation condition. It was considered that the display quality was best when the retardation of the liquid crystal layer was set equal to the total retardation for compensation, rather then when blackness of the background was retained.

At a pretilt angle larger than 5°, even if the total retardation for compensation was set larger than the retardation of the liquid crystal layer, crosstalk was not able to be reduced to a sufficient level. It was found that the performance of a compensation plate was not able to be extracted sufficiently, such as asymmetry of a visual angle caused by the influence of the pretilt angle.

Experiments were conducted for various pretilt angles. It was found that the distinct effect of reducing crosstalk by setting the total retardation for compensation larger than the retardation of the liquid crystal layer was at a pretilt angle of a minimum of 1° and a maximum of 5°.

Next, description will be made on a liquid crystal display device of the seventh embodiment. A visual angle compensation plate of the liquid crystal display device of the seventh embodiment has a structure different from that of the liquid crystal display device of the sixth embodiment. The visual angle compensation plate of the sixth embodiment has the laminated structure of two C plates, whereas the visual angle compensation plate of the seventh embodiment has a laminated structure of a C plate and a biaxial plate, the C plate being disposed on the liquid crystal cell side and the biaxial plate being disposed on the polarizing plate side.

Similar to the examples described above, a retardation of the liquid crystal layer is 560 nm. The C plate has a retardation of 240 nm, and the biaxial plate has an in-plane retardation of 50 nm and a retardation of 240 nm in a cross section in a thickness direction. A retardation of the visual angle compensation plate in a cross section in a thickness direction is 480 nm. A retardation of two polarizing plates in a cross section in a thickness direction is 120 nm similar to that of the examples described above. A total retardation for compensation is 600 nm which is about 1.07 times the retardation of the liquid crystal layer. The in-plane optical axis of the biaxial plate is perpendicular to the absorption axis of the polarizing plate.

Figure 27A:
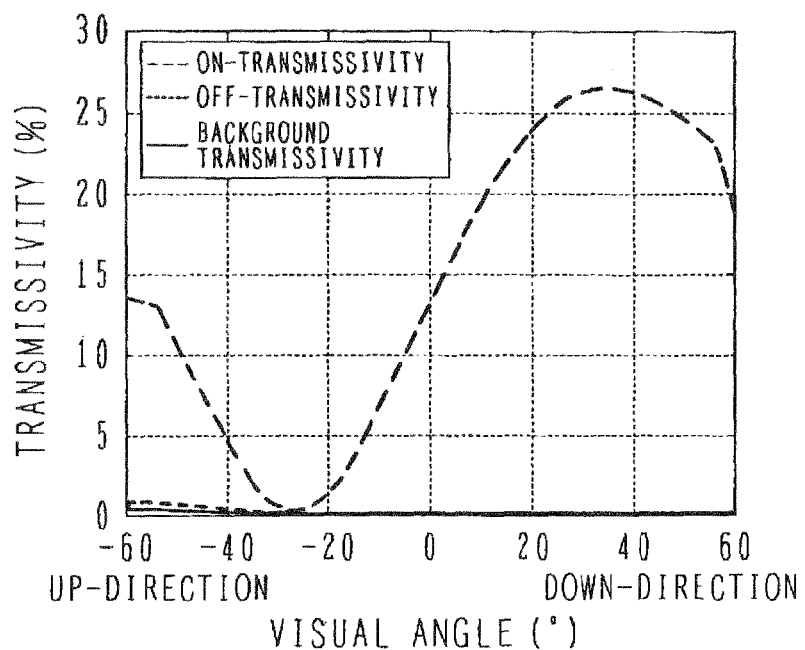
FIGS. 27(A) and 27(B) are graphs showing the visual angle characteristics of the liquid crystal display device of the seventh embodiment.
Figure 29A:
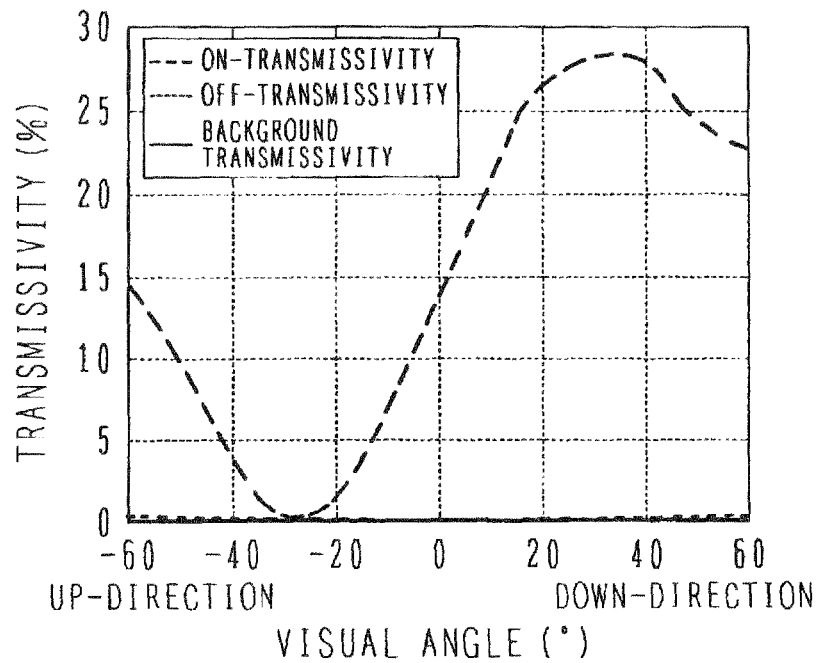
FIGS. 29(A) and 29(B) are graphs showing the visual angle characteristics of the liquid crystal display device of a ninth comparative example.

Next, with reference to FIGS. 27(A) and 27(B), description will be made on the experiments made to measure the visual characteristics of the liquid crystal display device of the seventh embodiment. As a ninth comparative example, a liquid crystal display device was manufactured whose total retardation for compensation was 560 nm which is equal to the retardation of the liquid crystal layer, and similar experiments were made. This device was manufactured by replacing the visual angle compensation plate of the seventh embodiment with a lamination of a C plate having a retardation of 220 nm and a biaxial plate having an in-plane retardation of 50 nm and a retardation of 220 nm in a cross section in a thickness direction. Graphs of the measurement results are shown in FIGS. 29(A) and 29(B).

Figure 27B:
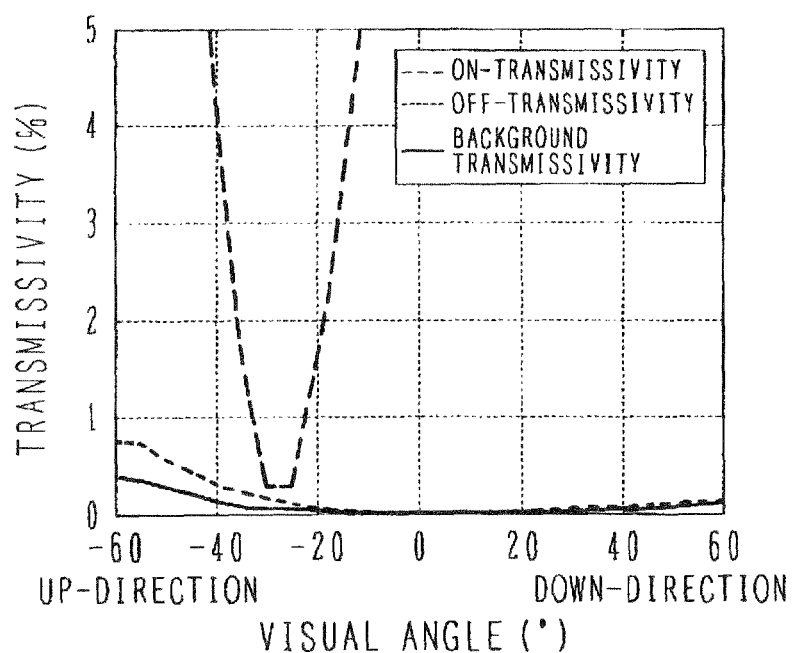
Figure 29B:
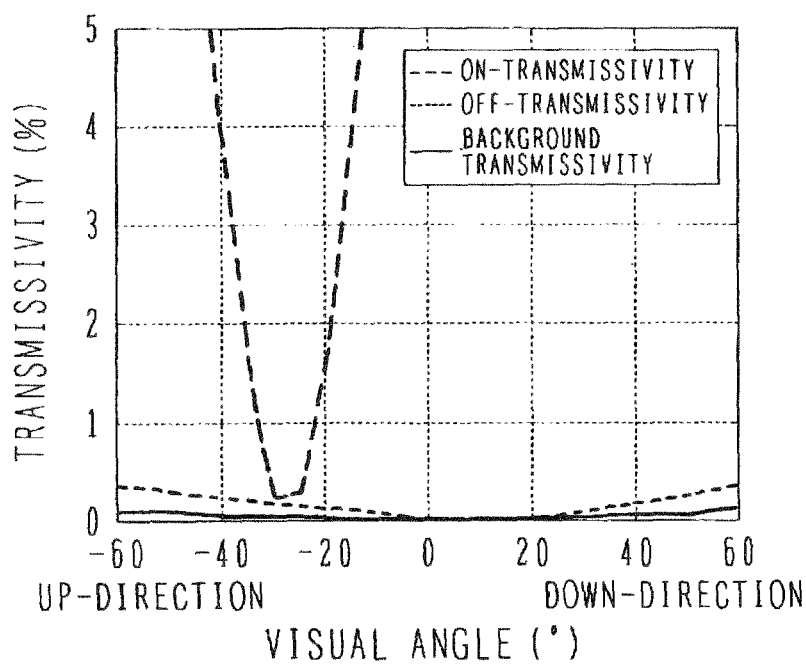
Figure 30A:
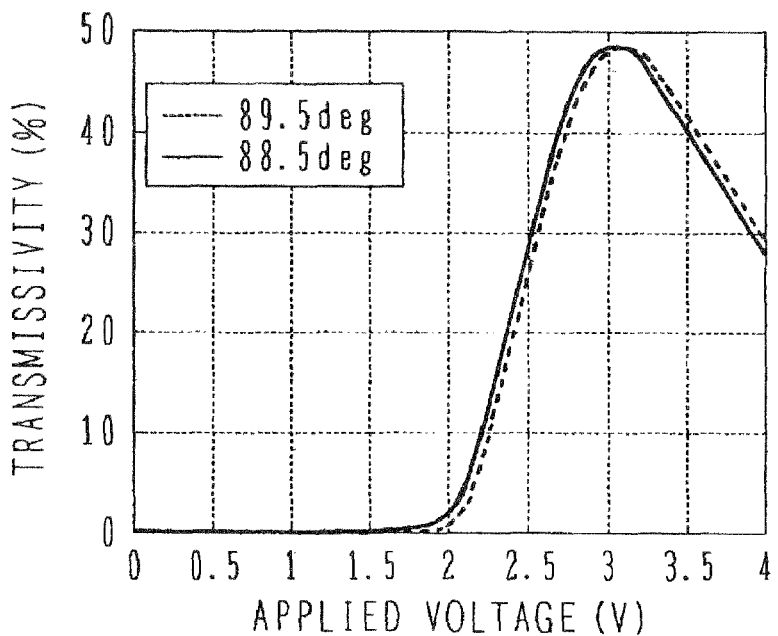
FIGS. 30(A) and 30(B) are graphs showing how the transmissivity—applied voltage characteristics change with a pretilt angle.
Figure 30B:
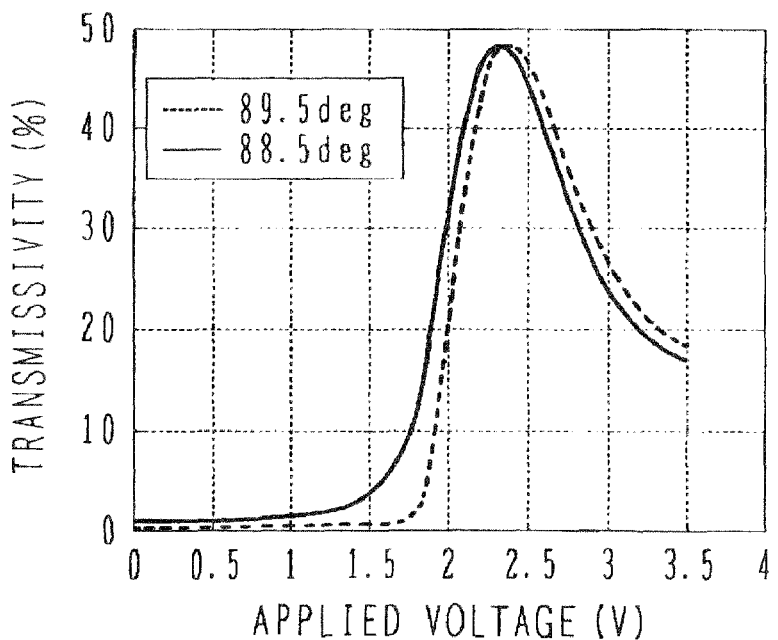

In the graphs shown in FIGS. 27(A), 27(B), 29(A) and 29(B), the abscissa represents a visual angle in the up- and down-directions, and the ordinate represents a transmissivity. A broken line indicates the on-transmissivity, a dotted line indicates the off-transmissivity, and a solid line indicates the background transmissivity. FIGS. 27(B) and 29(B) are enlarged views of FIGS. 27(A) and 29(A), respectively.

Along the best visual recognition direction (down-direction), although the off-transmissivity is larger than the background transmissivity in both the ninth comparative example and seventh embodiment, a difference between the off-transmissivity and background transmissivity of the seventh embodiment is suppressed very low as compared to that of the ninth comparative example. It has been found that even if the biaxial plate is used as the visual angle compensation plate, it is effective that the total retardation for compensation is set larger than the retardation of the liquid crystal layer.

As described so far, by setting the total retardation for compensation larger than the retardation of the liquid crystal layer, the liquid crystal display device can be obtained which can suppress crosstalk and has a high display quality even if a pretilt angle is large to some extent. It is particularly preferable to set the total retardation (absolute value) for compensation in a range of a minimum of 1.03 times and a maximum of 1.23 times the retardation of the liquid crystal layer. A pretilt angle is preferably set in a range of a minimum of 1° and a maximum of 5°.

In the embodiments described above, although the visual angle compensation plate is disposed between one planarizing plate and the liquid crystal cell, the visual angle compensation plate may be disposed between both the polarizing plates and the liquid crystal cell. If the polarizing plate does not have a retardation, the retardation of the visual angle compensation plate constitutes the total retardation for compensation.

A possible combination may be that a polarizing plate has a sufficiently large retardation and the visual angle compensation plate is not disposed singularly (e.g., in place of a TAC film on the liquid crystal cell side, a polarizing plate laminating a visual angle compensation is used). In this case, a retardation of the polarizing plate constitutes the total retardation for compensation. If this total retardation for compensation is larger than the retardation of the liquid crystal layer, it is expected that crosstalk can be reduced effectively.

The present invention has been described in connection with the preferred embodiments. The invention is not limited only to the above embodiments. It will be apparent to those skilled in the art that other various modifications, improvements, combinations, and the like can be made.

What is claimed is:

1. A liquid crystal display device comprising:
   a first polarizing plate;
   a vertically aligned liquid crystal cell disposed above said first polarizing plate, wherein the vertically aligned liquid crystal cell comprises a liquid crystal layer having a retardation larger than 555 nm in a cross section in a thickness direction, and a lower substrate and an upper substrate which sandwich said liquid crystal layer;

a negative C plate disposed above said upper substrate of said liquid crystal cell;

a biaxial plate disposed above said C plate;

a second polarizing plate disposed above said biaxial plate; and a control unit for simple-matrix driving said liquid crystal cell, wherein:

said first and second polarizing plates are disposed in a positional relation of generally cross-Nicol;

a pretilt angle is given to liquid crystal molecules in said liquid crystal layer in such a manner that a falling direction of said liquid crystal molecules has in a display plane an angle of about 45° relative to both absorption axes of said first and second polarizing plates when a drive voltage is applied to said liquid crystal cell;

said biaxial plate is disposed in such a manner that an in-plane delay phase axis of said biaxial plate is generally perpendicular in the display plane to the absorption axis of said second polarizing plate; and said liquid crystal display device is a normally black type.

2. The liquid crystal display device according to claim 1, wherein an in-plane retardation of said biaxial plate is 100 nm or smaller.

3. The liquid crystal display device according to claim 1, wherein said C plate is formed by a process of drawing a film made of organic resin.

4. The liquid crystal display device according to claim 1, wherein said biaxial plate is formed by a process of drawing a film made of organic resin.

5. The liquid crystal display device according to claim 1, further comprising another C plate disposed between said liquid crystal cell and said biaxial plate.

6. The crystal display device according to claim 1, wherein said first polarizing plate includes a first polarizer, said second polarizing plate includes a second polarizer, said C plate and said biaxial plate form a visual angle compensation member, and wherein a total value of retardations of said visual angle compensation member, said first polarizing plate and said second polarizing plate in a cross section in a thickness direction, from a surface of said first polarizer on a liquid crystal cell side to a surface of said second polarizer on a liquid crystal cell side, has a positive or negative sign opposite to, and an absolute value larger than, the retardation of said liquid crystal layer in the cross section in the thickness direction.

7. The liquid crystal display device according to claim 6, wherein the absolute value of said total value is in a range from a minimum of 1.03 times to a maximum of 1.23 times an absolute value of the retardation of said liquid crystal layer in the cross section in the thickness direction.

8. The liquid crystal display device according to claim 6, wherein the pretilt angle given to said liquid crystal molecules in said liquid crystal layer is in a range from a minimum of 1° to a maximum of 5°.

* * * * *

UNITED STATES PATENT AND TRADEMARK OFFICE
CERTIFICATE OF CORRECTION

PATENT NO.        : 8,269,929 B2
APPLICATION NO.   : 11/863078
DATED             : September 18, 2012
INVENTOR(S)       : Takashi Sugiyama It is certified that error appears in the above-identified patent and that said Letters Patent is hereby corrected as shown below:

On the Title Page:

Item (56) References Cited;

Under U.S. PATENT DOCUMENTS;

add --2006/0114383 A1    6/2006    Kobayashi et al--.

Signed and Sealed this
Twenty-seventh Day of November, 2012

David J. Kappos
*Director of the United States Patent and Trademark Office*